US009376958B1

(12) United States Patent
Bonora et al.

(10) Patent No.: US 9,376,958 B1
(45) Date of Patent: Jun. 28, 2016

(54) POINT-OF-USE ELECTRICITY GENERATION SYSTEM

(71) Applicants: Anthony Bonora, Portola Valley, CA (US); David G. Duff, Portola Valley, CA (US)

(72) Inventors: Anthony Bonora, Portola Valley, CA (US); David G. Duff, Portola Valley, CA (US)

(*) Notice: Subject to any disclaimer, the term of this patent is extended or adjusted under 35 U.S.C. 154(b) by 794 days.

(21) Appl. No.: 13/829,785

(22) Filed: Mar. 14, 2013

(51) Int. Cl.
*F02B 63/04* (2006.01)
(52) U.S. Cl.
CPC ....................... *F02B 63/04* (2013.01)
(58) Field of Classification Search
CPC ........................................................ F02B 63/04
USPC .............................................................. 307/64
See application file for complete search history.

(56) References Cited

U.S. PATENT DOCUMENTS

| 5,686,766 | A  | * | 11/1997 | Tamechika | F03D 9/003 307/31 |
| 6,281,601 | B1 | * | 8/2001  | Edelman   | H02J 3/1885 290/52 |
| 6,633,799 | B2 | * | 10/2003 | Krakovich | G05B 19/05 307/18 |
| 8,096,118 | B2 |   | 1/2012  | Williams  | |
| 8,099,198 | B2 |   | 1/2012  | Gurin     | |
| 2002/0190526 | A1 | * | 12/2002 | Kern | H02J 9/066 290/40 B |
| 2003/0177768 | A1 | * | 9/2003 | Pellizzari | F23D 11/448 60/737 |
| 2005/0052029 | A1 | * | 3/2005 | Aldridge | F02G 1/043 290/2 |
| 2006/0202559 | A1 | * | 9/2006 | Hashimoto | H02J 9/062 307/64 |
| 2008/0264922 | A1 | * | 10/2008 | Fosbinder | B23K 9/1006 219/133 |
| 2009/0260355 | A1 | * | 10/2009 | Alderson | F02G 1/0535 60/517 |
| 2009/0273240 | A1 | * | 11/2009 | Gurunathan | H02J 9/062 307/64 |
| 2010/0052429 | A1 | * | 3/2010 | Nethery, III | H02H 3/003 307/85 |
| 2012/0176088 | A1 | * | 7/2012 | Lee | H02J 3/383 320/128 |
| 2012/0283968 | A1 | * | 11/2012 | Katsuki | A61B 5/1473 702/60 |
| 2013/0101873 | A1 | * | 4/2013 | Dionne | F01K 27/02 429/9 |

OTHER PUBLICATIONS

Wikipedia, "Stirling Engine", http://en.wikipedia.org/wiki/Stirlingengine, last accessed Mar. 16, 2013, 20 pages.

* cited by examiner

*Primary Examiner* — Thienvu Tran
*Assistant Examiner* — Kevin J Comber
(74) *Attorney, Agent, or Firm* — Hickman Palermo Becker Bingham LLP

(57) ABSTRACT

An electricity generation system (EGS) is provided that can be deployed at a point-of-use site (e.g. residence, business, etc.). In one implementation, the EGS includes a generator for generating electricity (where the generator includes a Stirling engine that uses gaseous fuel for a combustion fuel source), an interface for interfacing with an electrical infrastructure of the site as well as a power grid, and a controller for controlling the operation of the EGS. The EGS may be used in conjunction with the power grid, and may selectively provide electricity to the electrical infrastructure based upon instructions from a utility provider that manages the power grid, based upon an electrical load imposed on the electrical infrastructure, based upon the electrical capacity provided by the power grid, based upon cost considerations, etc. By taking some or all of these considerations into account, the EGS can adapt its behavior to fit changing conditions.

44 Claims, 2 Drawing Sheets

POINT-OF-USE ELECTRICITY GENERATION SYSTEM

BACKGROUND

The traditional and still current approach for providing electricity to point-of-use sites (such as residences, businesses, etc.) is based upon a centralized generation model. Under this model, a centralized power plant converts energy, derived from a variety of energy sources, such as coal, oil, natural gas, water, wind, solar, nuclear, etc., into electricity. The electricity is then transmitted to the point-of-use sites via a power distribution grid (hereinafter, "power grid"), which typically includes a combination of high voltage long distance transmission lines, regional medium voltage lines, and local direct hookup lines.

The energy conversion efficiency that can be achieved by a power plant differs based upon the type of plant and the energy source that is used by the plant, but it has been estimated that a power plant that uses fossil fuels, for example, is able to achieve a peak energy conversion efficiency of 50%-60%. This means that the electricity that is generated by the power plant is 50%-60% of the energy derived from the energy source, which in turn means that 40%-50% of the energy is lost during the conversion process. This peak efficiency of the plant is achieved at full plant output; for partial loads, the conversion efficiency is even lower. In addition to conversion losses, there are also distribution losses. It has been estimated that 20%-35% of the electricity provided by the power plant to the power grid is lost in the process of distributing the electricity to the point-of-use sites. Taking conversion losses, distribution losses, and other losses into account, it has been estimated that only a 30%-45% average net efficiency is achieved using the centralized generation model, which means that 55%-70% of the energy derived from the energy source at the power plant is lost. This inefficiency leads to many adverse consequences, such as higher energy costs.

Another drawback of the centralized generation model is that it does not adapt well to changing demand loads. Typically, to accommodate greater energy demand, an energy provider, such as a utility company, brings one or more additional power plants online, or increases the output of one or more currently operating power plants. This usually requires a fair amount of lead time; thus, this increase in capacity only works well when the increase in demand is known in advance. For unscheduled or unpredictable demand increases, the centralized generation model does not adapt very well or very quickly. As a result, the utility company is put to a difficult choice. The utility company can constantly maintain enough electrical capacity to satisfy a typical peak load. This would mean, however, that for most of the time, more electrical capacity is available than is used; hence, energy is wasted. Alternatively, the utility company can provide just enough electrical capacity to satisfy a normal demand load. However, if energy demand rises unexpectedly, the utility company will not be able to adapt quickly to accommodate the increased demand. This alternative approach can lead to such adverse consequences as temporary blackouts and rolling blackouts, which have been experienced repeatedly over the years.

BRIEF DESCRIPTION OF THE DRAWING(S)

DETAILED DESCRIPTION OF EMBODIMENT(S)

In view of the shortcomings of the centralized generation model, one embodiment of the present invention provides an electricity generation system (EGS) that can be deployed at a point-of-use site (hereinafter, "site"). For purposes of the present invention, a site may be any location at which electricity is consumed, which may include but is not limited to residences, businesses, schools, plants, warehouses, stores, etc. In one embodiment, the EGS may be used in conjunction with a power grid, and the electricity from the EGS may be used to supplement electricity from the power grid, or completely replace the electricity from the power grid, or supplement the electricity from the power grid at times and replace the electricity from the power grid at other times. Because the EGS is deployed at the site at which electricity is actually consumed, the EGS does not suffer the distribution losses that are suffered by the power grid. Hence, it is more efficient. Also, in one embodiment, the EGS can be controlled to adapt to changing conditions, such as varying loads and capacities. Thus, with the EGS, it is possible to adapt quickly to varying demand loads, which the power grid cannot do.

System Description

Figure 1:
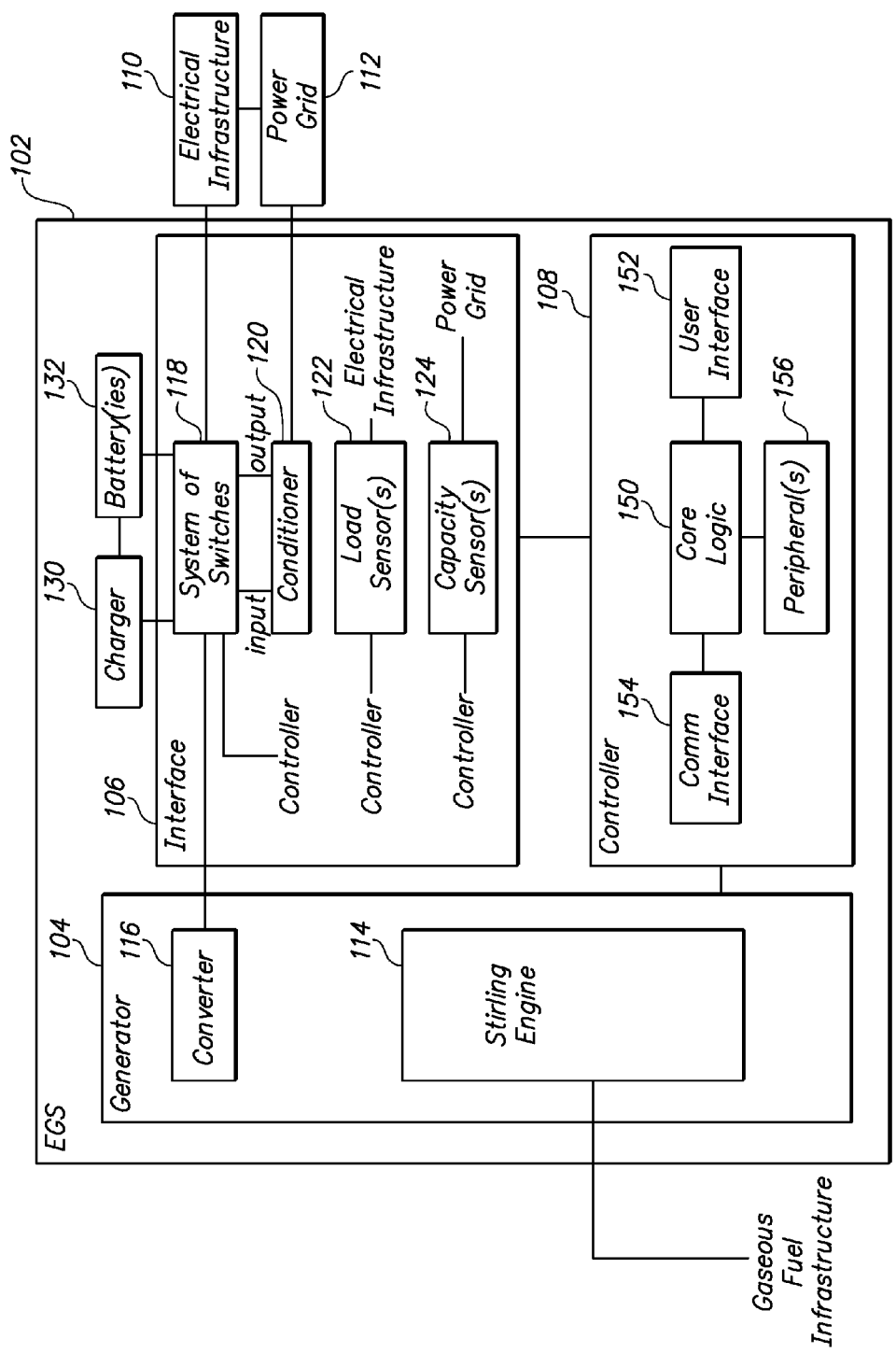
FIG. 1 is a block diagram of an electricity generation system (EGS) in accordance with one embodiment of the present invention.

With reference to FIG. 1, there is shown a block diagram of an EGS in accordance with one embodiment of the present invention. As shown, the EGS 102 comprises a generator 104 for generating electricity, an interface 106 for interfacing with an electrical infrastructure 110 of the site as well as the power grid 112, and a controller 108 for controlling the operation of the EGS 102. The EGS 102 may optionally further comprise a charger 130 and one or more batteries 132 for storing electricity.

Generator

In one embodiment, the generator 104 comprises a Stirling engine 114 for converting heat energy into mechanical energy (in the form of mechanical motion), and a converter 116 for converting the mechanical motion from the Stirling engine 114 into electricity. A Stirling engine is a well-known type of external combustion engine that employs cyclical compression and expansion of a working fluid (e.g. air or some other gas) at different temperature levels to convert heat energy into mechanical energy. In one embodiment, the Stirling engine 114 uses gaseous fuel (such as, for example, natural gas, propane, ethane, methane, etc.) for combustion to produce the heat energy needed by the Stirling engine 114 to operate. The Stirling engine 114 may receive the gaseous fuel, for example, by coupling to an existing gaseous fuel infrastructure at the site. The gaseous fuel infrastructure may be, for example, an underground gas distribution network, an above ground gas storage facility, or any other infrastructure from which gaseous fuel can be received. Many if not most sites already have such an infrastructure in place. The gaseous fuel is currently being used for heating and cooking purposes. However, with the EGS 102, the gaseous fuel may also be used to generate electricity. An advantage of using gaseous fuel as an energy source for the generator 104 is that, unlike other energy sources such as solar and wind which are intermittent and unreliable, gaseous fuel is constantly available (barring rare interruptions). Thus, the generator 104 can be invoked at almost any time to generate electricity for the site.

Also, gaseous fuel is a relatively inexpensive energy source. This enables the generator 104 to generate electricity cost effectively. In addition, gaseous fuel burns cleanly and has no residual solid waste, unlike coal. Furthermore, gaseous fuel is already available at most sites. Thus, it can be readily exploited.

A Stirling engine 114 has a number of desirable properties that make it well suited for use in the generator 104 of the EGS 102. First of all, a Stirling engine 114 operates relatively quietly as compared to other types of engines, such as diesel or gas powered internal combustion engines. This is a very desirable property considering that the EGS 102 will be deployed on-site. Also, a Stirling engine 114 expels just hot air, carbon dioxide, and perhaps condensation, with very low levels of fumes, smoke, and other types of noxious waste. Thus, it is environmentally friendly. In addition, a Stirling engine 114 is safe to operate and requires very little maintenance. Hence, it can operate for long periods of time at a site with very little upkeep. For these and other reasons, one embodiment of the EGS 102 uses a Stirling engine 114 to produce the mechanical motion needed by the generator 104 to generate electricity. For purposes of the present invention, however, other types of engines, including but not limited to enhanced Stirling type engines, may be used if so desired.

Figure 2:
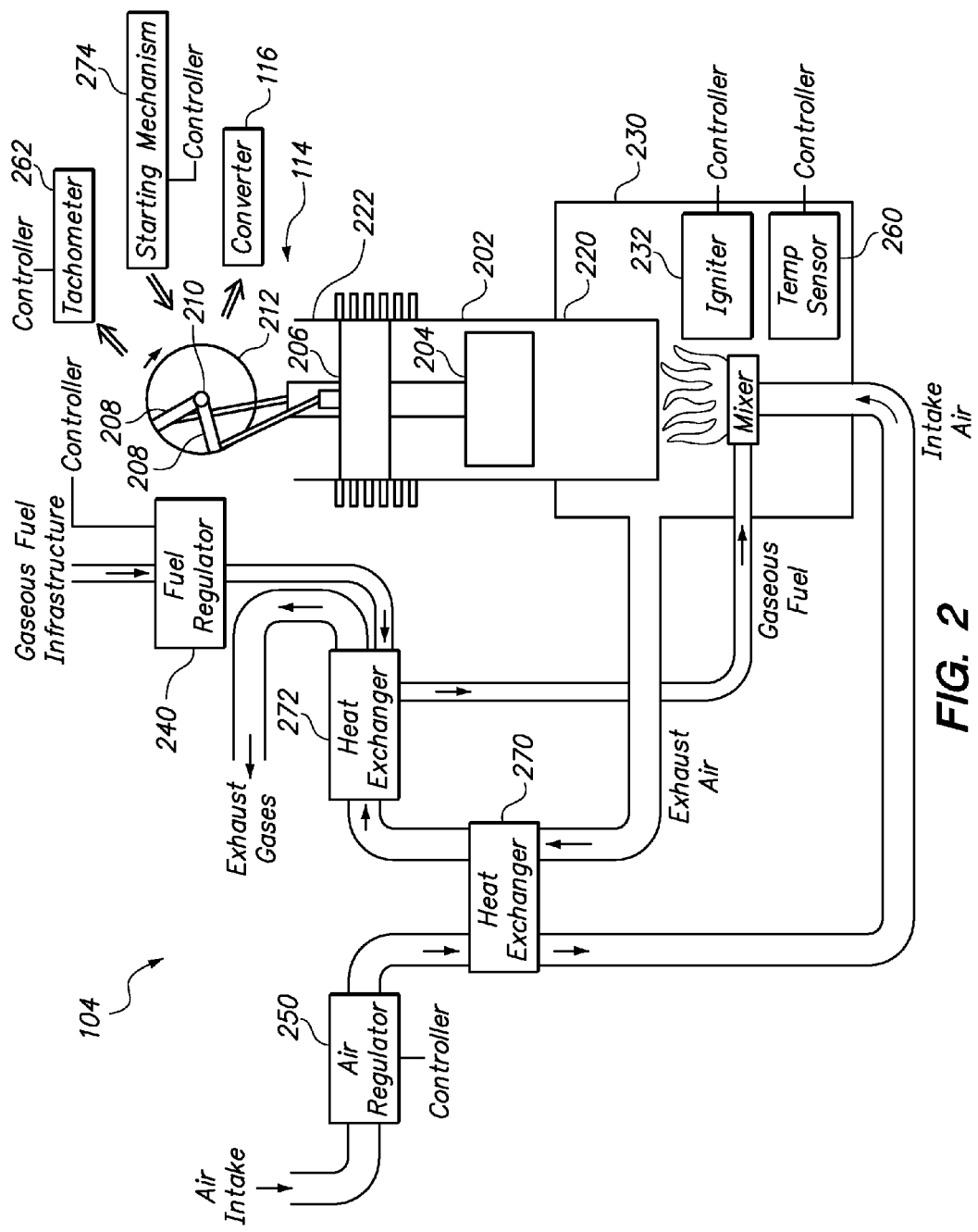
FIG. 2 is a more detailed diagram of the generator shown in FIG. 1, in accordance with one embodiment of the present invention.

In one embodiment, the Stirling engine 114 takes the form of a beta type Stirling engine, as shown in FIG. 2 (note: other types of Stirling engines, such as alpha and gamma type, may be used if so desired). With a beta type Stirling engine 114, there is a single cylinder 202 within which two separate pistons are housed: (1) a displacer piston 204; and (2) a power piston 206. The displacer piston 204 is allowed to fit loosely within the cylinder 202 whereas the power piston 206 forms a seal with the cylinder 202 to trap a working fluid (e.g. air, etc.) within. Each piston 204, 206 has a separate piston rod, and each piston rod is attached to a separate arm 208 of a crankshaft 210 (the crankshaft extends out from the page). The other end of the crankshaft 210 is attached to a flywheel 212. The rods of the pistons 204, 206 are attached to the arms 208 of the crankshaft 210 approximately ninety degrees out of phase. This phase difference allows the pistons 204, 206 to operate together to rotate the flywheel 212 in the direction shown in FIG. 2 once the engine is started.

The cylinder 202 has a hot end 220 and a cold end 222. The hot end 220 is heated by combusting a fuel source, such as a gaseous fuel. The cold end 222 is cooled by a cooling device. For purposes of the present invention, any cooling device using any cooling medium may be used. For example, the cooling device may be a heat sink that uses air as the cooling medium, or a heat exchanger that uses liquid as the cooling medium, or an air conditioner, or a set of fins combined with a fan for blowing air across the fins, etc. The hot end 220 and the cold end 222 provide opposing environments that create pressure differences within the cylinder 202. These pressure differences facilitate movement of the pistons. Specifically, as the displacer piston 204 is pulled up, the cool working fluid from the cold end 222 flows around the displacer piston 204 into the hot end 220. As the working fluid is heated in the hot end 220, pressure builds and pushes the power piston 206 up. Then, as the displacer piston is pushed down (by the motion of the power piston 206 and the flywheel 212), hot working fluid from the hot end 220 flows around the displacer piston 204 into the cold end 222. As the hot air in the cold end 222 is cooled, pressure decreases and the power piston 206 is caused to move in the opposite direction. Thus, in this manner, the pressure differences in the hot and cold ends 220, 222 and the motion of the pistons 204, 206 and the flywheel 212 work together to maintain the engine and the flywheel 212 in continuous motion. Mechanical motion is thus created.

In one embodiment, the hot end 220 of the cylinder 202 is enclosed within a combustion chamber 230. In the combustion chamber 230, gaseous fuel and intake air are received and mixed, and the mixture is ignited by an igniter 232 (which, in one embodiment, is controlled by the controller 108) to give rise to the combustion that produces the heat energy used by the Stirling engine 114 to operate. In one embodiment, the amount of gaseous fuel fed to the combustion chamber 230 is controlled by a fuel regulator 240 (which, in one embodiment, is controlled by the controller 108). The fuel regulator 240 may be coupled to an existing gaseous fuel infrastructure at the site to receive gaseous fuel therefrom, and may take, for example, the form of one or more electronically controlled valves. The generator 104 may also comprise an air regulator 250 (which, in one embodiment, is controlled by the controller 108) for controlling the amount of intake air that is fed to the combustion chamber 230. The air regulator 250 may, for example, take the form of a variable speed blower or fan. By controlling the amount of fuel (and perhaps air) fed to the combustion chamber 230, the controller 108 can control, for example, the amount of mechanical energy produced by the Stirling engine 114, which in turn, controls the amount of electricity generated by the generator 104.

Hot, oxygen-depleted gases are expelled from the combustion chamber 230. These hot exhaust gases, which may be in the range of 1800 degrees Fahrenheit, could be expelled directly to the environment if so desired. However, that would be a waste of heat energy that could otherwise be used. In one embodiment, to improve efficiency of the Stirling engine 114, the hot exhaust gases are fed to one or more heat exchangers. As shown in FIG. 2, the hot exhaust gases from the combustion chamber 230 may be fed to a first heat exchanger 270 to preheat the incoming air (to, for example, about 1400 degrees Fahrenheit) before the incoming air is fed to the combustion chamber 230. With the incoming air already at a high temperature, less heating will need to be done in the combustion chamber 230; thus, efficiency is improved. The hot exhaust gases exiting from the first heat exchanger 270, which may be in the range of 400 degrees Fahrenheit, may further be fed to a second heat exchanger 272 to preheat the incoming gaseous fuel (to, for example, about 300 degrees Fahrenheit) before the gaseous fuel is fed to the combustion chamber 230. Doing so reduces the temperature difference between the incoming fuel and the combustion chamber 230. This further reduces the amount of heating that needs to be done in the combustion chamber 230, which further improves efficiency. After exiting the second heat exchanger 272, the hot exhaust gases may be released into the environment. At this point, the temperature of the exhaust gases may be in the range of 250 degrees Fahrenheit.

In the above example, two heat exchangers are shown. However, if so desired, more or fewer heat exchangers may be used. Also, for purposes of the present invention, any known type of heat exchanger may be used. As a result of passing the hot exhaust gases through the heat exchangers, some condensation may form. In one embodiment, the generator 104 may further comprise a mechanism (not shown) that collects the liquid from the condensation and expels it to, for example, a drain, a drain pipe, the environment, etc.

In addition to the components already described, the generator 104 may further comprise a temperature sensor 260, which is situated within the combustion chamber 230, for providing temperature information to the controller 108. The generator 104 may further comprise a tachometer 262 coupled to the flywheel 212 or the crankshaft 210 for providing rate-of-revolution information (e.g. rotations per minute (RPM)) to the controller 108. The controller 108 may use information from these and other sensors to control the operation of the generator 104 (e.g. to ensure that the generator 104 operates within safe parameter ranges, to control the amount of electricity generated by the generator 104, etc.).

As with any engine, the Stirling engine 114 uses a starting mechanism 274 to initiate engine motion. In one embodiment, the starting mechanism 274 (which, in one embodiment, is controlled by the controller 108) initiates motion in the Stirling engine 114 by causing the flywheel 212 to rotate in the direction shown in FIG. 2, which in turn causes the displacer piston 204 and the power piston 206 to move up and down. With sufficient initiating motion, and heat energy from the combustion of the gaseous fuel, the Stirling engine 114 will reach a state at which the engine motion is self-sustaining. For purposes of the present invention, the starting mechanism 274 may take the form of any known starting mechanism, such as, for example, an electric motor, a generator being operated in a reverse or motor mode, etc.

The mechanical motion produced by the Stirling engine 114 is used by the converter 116 to generate electricity. For purposes of the present invention, the converter 116 may be any type of mechanism or device capable of converting mechanical motion into electricity. For example, the converter 116 may be a rotary type of converter that uses the rotational motion from the crankshaft 210 or flywheel 212 to move one or more magnets rotationally through a set of coils. The movement of the magnet(s) through the coils causes electricity to be generated. Alternatively, another mechanism, such as another piston (not shown) may be used to convert the rotational motion from the crankshaft 210 or flywheel 212 into linear motion, and the converter 116 may be a linear type of converter that uses the linear motion from the piston to move one or more magnets linearly through a set of coils, thereby generating electricity. Overall, many types of converters are currently known, and any desired type of converter may be used for purposes of the present invention. In one embodiment, the converter 116 takes the form of a mechanism that can be operated in one mode to convert mechanical motion into electricity and in a reverse mode to convert electricity into mechanical motion. With such a converter 116, a separate starting mechanism 274 is not needed as the converter 116 may be operated in reverse mode to act as the starting mechanism 274 for the Stirling engine 114. This and other types of converters 116 may be used. The type of electricity generated by the converter 116 may be direct current (DC) or alternating current (AC).

Interface

The electricity generated by the generator 104 is provided to the interface 106. In turn, the interface 106 selectively couples to the electrical infrastructure 110 of the site to provide electricity thereto. The electrical infrastructure 110 refers to the electrical wiring of the site, and the interface 106 may couple to the electrical infrastructure 110 via a junction box, for example. Coupled to the electrical infrastructure 110 are all of the devices at the site that consume electricity, such as, for example, lights, appliances, electronic devices, air conditioner, etc. All of these devices contribute to an overall electrical load imposed on the electrical infrastructure 110. To service this load, the electrical infrastructure 110 may be coupled to a power grid 112 to receive electricity therefrom. The electrical infrastructure 110 may also receive electricity from the EGS 102 to service all or a portion of the load. In one embodiment, the interface 106 enables the EGS 102 to operate in conjunction with the power grid 112 such that electricity from the EGS 102 may be used to supplement electricity from the power grid 112, or completely replace the electricity from the power grid 112, or supplement the electricity from the power grid 112 at times and replace the electricity from the power grid 112 at other times.

In one embodiment, the interface 106 comprises a system of one or more switches 118 and a conditioner 120 (note: the conditioner 120 need not be implemented as part of the interface 106; if so desired, the conditioner 120 may be removed from the interface 106 and implemented, for example, as a separate component that is coupled to or is a part of the electrical infrastructure 110). For the sake of simplicity, only one conditioner 120 is shown in FIG. 1; however, it should be noted more than one conditioner 120 may be included in interface 106, if so desired. The conditioner 120 has an input and an output, and is designed to condition electricity received at the input to produce electricity at the output that is compatible with electricity from the power grid 112. In this regard, the conditioner 120 may perform a number of functions. For example, if the electricity received at the input is DC, the conditioner 120 may convert it to AC. Also, the conditioner 120 may perform one or more conditioning operations, such as, for example, voltage adjustment, frequency matching, phase adjustment (single phase or three phase adjustment), etc., on the electricity received at the input to cause the electricity at the output to have a voltage, frequency, phase structure, etc., that are compatible with the electricity delivered by the power grid 112 to the electrical infrastructure 110. To enable the conditioner 120 to determine what voltage, frequency, phase structure, etc., would be compatible with the electricity from the power grid 112, the conditioner 120 may be coupled to the power grid 112 to sample the electricity therefrom. By making electricity from the EGS 102 compatible with electricity from the power grid 112, the conditioner 120 makes it possible for the EGS 102 to operate in conjunction with the power grid 112 to supplement or replace the electricity provided by the power grid 112. In one embodiment, the conditioner 120 takes the form of one or more power inverters. However, for purposes of the present invention, the conditioner 120 may take the form of any one or more components capable of making electricity from the EGS 102 compatible with electricity from the power grid 112.

Whether the EGS 102 is coupled to the electrical infrastructure 110 to provide electricity thereto is determined by the system of switches 118. The system of switches 118 also determines the manner in which various other components are coupled. By properly controlling the system of switches 118, it is possible to cause the EGS 102 to operate in different modes. In one embodiment, the system of switches 118 is electronically controlled by the controller 108. For purposes of the present invention, the switches in the system of switches 118 may take on any of various forms. For example, some or all of the switches in the system of switches 118 may be electronically controlled physical switches or breakers that can be made to physically open or close. Some or all of the switches in the system of switches 118 may be electronically controlled solid state switches that can be made to electrically connect or disconnect. Some of the switches may be physical switches while others are solid state switches. For purposes of the present invention, any combination of any types of switches may be used for forming the system of switches 118.

As shown in FIG. 1, the system of switches 118 is coupled to the conditioner 120, the converter 116 of the generator 104, the charger 130, the one or more batteries 132, and the electrical infrastructure 110 of the site. By coupling the various components in various ways, the system of switches 118 can cause the EGS 102 to operate in different modes. For example, to cause the EGS 102 to provide electricity generated by the generator 104 to the electrical infrastructure 110, the system of switches 118 may couple the output of the converter 116 (which serves as the output of the generator 104) to the input of the conditioner 120, and couple the output of the conditioner 120 to the electrical infrastructure 110. This causes electricity from the generator 104 to be processed through the conditioner 120 and passed on to the electrical infrastructure 110.

To cause the one or more batteries 132 to be charged, the system of switches 118 may couple the output of the converter 116 to the charger 130, and decouple the one or more batteries 132 from all components except for the charger 130. This causes the charger 130 to use the electricity generated by the generator 104 to charge the one or more batteries 132. Because the one or more batteries are not coupled to other components, they will not be drained.

To provide electricity from the one or more batteries 132 to the electrical infrastructure 110, the system of switches 118 may couple the one or more batteries 132 to the input of the conditioner 120, and couple the output of the conditioner 120 to the electrical infrastructure 110. This causes electricity from the one or more batteries 132 to be processed through the conditioner 120 and passed on to the electrical infrastructure 110.

In some embodiments, separate conditioners 120 may be provided for the generator 104 and the one or more batteries 132. In such embodiments, the system of switches 118 may couple the one or more batteries 132 to the input of another conditioner (not shown), and couple the output of that conditioner to the electrical infrastructure 110. This causes electricity from the one or more batteries 132 to be processed through the other conditioner and passed on to the electrical infrastructure 110.

To provide electricity from both the generator 104 and the one or more batteries 132 to the electrical infrastructure 110, the system of switches 118 may couple the output of the converter 116 and the one or more batteries 132 to the input of the conditioner 120, and couple the output of the conditioner 120 to the electrical infrastructure 110. This causes electricity from both the generator 104 and the one or more batteries 132 to be processed through the conditioner 120 and passed on to the electrical infrastructure 110.

In embodiments where separate conditioners 120 are provided for the generator 104 and the one or more batteries 132, the system of switches 118 may couple the output of the converter 116 to the input of the conditioner 120, couple the output of the conditioner 120 to the electrical infrastructure 110, couple the one or more batteries 132 to the input of another conditioner (not shown), and couple the output of that conditioner to the electrical infrastructure 110. This causes electricity from the generator 104 and the one or more batteries 132 to be processed through separate conditioners 120 and then passed on to the electrical infrastructure 110.

The above examples show just a few ways in which the system of switches 118 may couple the various components to achieve various operational modes. Many other ways are possible, and all such possibilities are within the scope of the present invention.

In addition to the components already described, the interface 106 may further comprise one or more load sensors 122 for sensing the electrical load imposed on the electrical infrastructure 110 of the site. The one or more load sensors 122 may, for example, take the form of one or more watt meters, watt-hour meters, etc., coupled to the electrical infrastructure 110. The interface 106 may further comprise one or more capacity sensors 124 for sensing how much electrical capacity the power grid 112 is providing to the electrical infrastructure 110 of the site. The one or more capacity sensors 124 may, for example, take the form of one or more watt meters, watt-hour meters, etc., coupled to the power grid 112. In one embodiment, the one or more load sensors 122 and the one or more capacity sensors 124 provide sensor information to the controller 108. This sensor information may be used by the controller 108 to control the operation of the EGS 102, as will be described in a later section.

Controller

The overall operation of the EGS 102 is controlled by the controller 108. In one embodiment, the controller 108 comprises core logic 150, a set of user interface components 152, zero or more communication interfaces 154, and zero or more peripherals 156.

The core logic 150 is the central component that controls the operation of the controller 108. In one embodiment, it is the core logic 150 that performs the control functions described herein for controlling the operation of the EGS 102. In addition to the control functions, the core logic 150 may also perform user interface functions for interacting with a user. The core logic 150 may further perform communication functions for communicating and interacting with one or more external components. The core logic 150 may perform other functions as well. The functions performed by the core logic 150 will be described in greater detail in later sections, but suffice it to say at this point that it is the core logic 150 that dictates the operation of the controller 108. Thus, when it is stated that the controller 108 performs a certain operation, it should be understood that it is the core logic 150 that is causing the controller 108 to perform the operation.

For purposes of the present invention, the core logic 150 may be implemented using any known technology. For example, the core logic 150 may take the form of one or more processors and a storage, wherein the one or more processors execute instructions or algorithms stored on the storage. When the one or more processors execute the instructions, the one or more processors are "configured", or caused, by the instructions (i.e. the software) to perform the functions described herein. For purposes of the present invention, the storage may be any type of machine-readable or computer-readable storage capable of storing instructions, including but not limited to volatile or non-volatile storage, persistent or non-persistent storage, semiconductor storage (e.g. memory, RAM, ROM, PROM, EPROM, flash memory, etc.), magnetic storage (e.g. hard drive, floppy disk, etc.), optical storage (e.g. CD, DVD, Blue Ray, CD-ROM, CD-RW, etc.), physical storage (punch cards, paper tape, other physical medium with patterns of holes), cloud storage accessible via a network, etc. Alternatively, the core logic 150 may be hardware implemented using a device (e.g. a programmable logic array, etc.) having a plurality of elements, including logical elements, that are programmed/configured to implement the functions described herein. As a further alternative, the core logic 150 may be hardware implemented by way of another device, such as an application specific integrated circuit (ASIC), having elements, including logical elements, that are constructed/configured to implement the functions described herein. These and other implementations of the core logic 150 are possible. All such possible implementations are within the scope of the present invention.

The core logic 150 is coupled to a set of user interface components 152. In one embodiment, the set of user interface components 152 comprises components that enable output to be provided to, and input to be received from, a user. On the output side, the user interface components 152 may include, for example, a display for providing visual information (e.g. text, graphics, etc.) to a user, and a speaker for providing audio information (e.g. sounds, speech messages, etc.) to the user. On the input side, the user interface components 152 may include, for example, a cursor control device (e.g. mouse, trackball, arrow keys, etc.), a keypad or keyboard for entering information, a touch sensitive screen, and a microphone for receiving voice commands. These and other user interface components may be included in the set of user interface components 152. The core logic 150 uses the user interface components 152 to interact with a user.

The core logic 150 may also be coupled to one or more communication interfaces 154. The one or more communication interfaces 154 enable the controller 108 to communicate with one or more external components/devices. In one embodiment, the one or more communication interfaces 154 may comprise a network interface. The network interface may be a wired or a wireless network interface. A wired network interface may physically couple, for example, to a router, a local area network (LAN), a wide area network (WAN), a modem, etc., to gain access to a network. A wireless network interface may wirelessly couple, for example, to a wireless router, a Wi-Fi access point, a 2G, 3G, or 4G access point, etc., to gain access to a network. Once on the network, the network interface can send and/or receive messages via the network. The network may provide access to the Internet. If so, then the network interface, and hence, the controller 108, will be able to send and/or receive messages to/from almost any external component or device that is connected to the Internet. In one embodiment, the network interface sends/receives messages in the form of one or more packets.

In one embodiment, it is envisioned that rather than using a separate network for communication, the power grid 112 itself may be used to send/receive messages. For example, a utility provider managing the power grid 112 may use the wiring of the power grid 112 to send/receive messages. In such a scenario, the one or more communication interfaces 154 may comprise a communication interface that is adapted to couple to the power grid 112 and to send and/or receive messages via the power grid 112. These and other types of communication interfaces may be included in the one or more communication interfaces 154. Overall, any type of communication interface that enables the controller 108 to communication with an external component/device may be included in the one or more communication interfaces 154.

The core logic 150 may also be coupled to one or more peripherals 156. The one or more peripherals 156 may include, for example, a persistent storage for persistently storing data (which may include executable instructions) used by the core logic 150. The one or more peripherals 156 may also include one or more data interfaces (e.g. USB port, eSata port, firewire port, etc.) for enabling an external device to couple to the controller 108. With such a data interface, information may be transferred to or extracted from the controller 108. The one or more peripherals 156 may further include a clock for enabling the controller 108 to determine the date and time. These and other components may be included in the one or more peripherals 156 to facilitate/enhance the function and operation of the controller 108.

The controller 108 uses electricity to power its operation. The controller 108 may receive this electricity from the power grid 112, the one or more batteries 132, the generator 104, another set of batteries (not shown) or some other source, or a combination thereof. In one embodiment, the controller 108 uses the power grid 112 as the primary source and the one or more batteries 132 or another set of batteries (not shown) as a backup source. By having a backup power source, it is ensured that the controller 108 will be able to invoke and control the EGS 102 even when electricity from the power grid 112 is not available (e.g. during a blackout).

Sample Operations

With the above system description in mind, the operation of the EGS 102 will now be described. In the following sample operation descriptions, reference will be made to FIGS. 1 and 2.

Maintenance of State Information

In one embodiment, the controller 108 maintains a set of state information that indicates the current operational state of the EGS 102. This state information may include, for example, information indicating: (1) whether the generator 104 (and hence, the Stirling engine 114) is currently running; (2) whether electricity from the generator 104 is currently being provided to the electrical infrastructure 110; (3) whether electricity from the one or more batteries 132 is currently being provided to the electrical infrastructure 110; and (4) whether the one or more batteries 132 are currently being charged. This state information may be used by the controller 108 in performing its control functions.

Utility Provider Controlled Operation

In one embodiment, the operation of the EGS 102 may be controlled by a utility provider that manages the power grid 112. The utility provider may control the operation of the EGS 102 by sending one or more messages to a communication interface 154 of the controller 108. In response to the messages, the controller 108 may control the operation of the EGS 102 in accordance with instructions contained in the messages. By allowing the utility provider to dictate, at least in part, the operation of the EGS 102, the controller 108 gives the utility provider the ability to adapt quickly to changing conditions. This is something the power grid 112 currently cannot do on its own.

Initiating Provision of Electricity

Suppose that the utility provider determines that the power grid 112 is currently overtaxed. This may be due to a variety of reasons. For example, it may be a hot day and many users may be using their air conditioning units. It may be because one of the power plants is currently down. It may be because many users have returned home and are charging their electric cars at the same time. Whatever the reason, the utility provider determines that it needs to enlist the aid of the EGS 102 to provide electricity to the site. Hence, the utility provider sends a message to the communication interface 154 of the controller 108 indicating that the EGS 102 should provide electricity to the electrical infrastructure 110 of the site. This message may be sent, for example, on a network or on the power grid 112 itself, and it may take the form of one or more packets. The message may be a directed message that is sent only to the communication interface 154 of this EGS 102, or it may be a general message that is sent to all communication interfaces of all EGSs.

The message is processed by the controller 108 (more specifically, by the core logic 150). In response, the controller 108 may determine whether electricity from the generator 104 is currently already being provided to the electrical infrastructure 110. This may be done by checking the state information maintained by the controller 108. If the state information indicates that electricity from the generator 104 is already being provided to the electrical infrastructure 110, then the controller 108 may choose to ignore the message.

On the other hand, if electricity from the generator 104 is not currently being provided to the electrical infrastructure 110, the controller 108 may determine whether the generator 104 is currently running (the generator 104 may be currently running, for example, because the one or more batteries are currently being charged). The controller 108 may again make this determination by checking the state information maintained by the controller 108. If the generator 104 is currently running, then the controller 108 may cause the system of switches 118 to couple the output of the converter 116 (which acts as the output of the generator 104) to the input of the conditioner 120 and to couple the output of the conditioner 120 to the electrical infrastructure 110. This causes electricity from the generator 104 to be provided to the electrical infrastructure 110 of the site to supplement or replace electricity from the power grid 112. The controller 108 may thereafter update the state information to indicate that electricity from the generator 104 is currently being provided to the electrical infrastructure 110.

On the other hand, if the controller 108 determines that the generator 104 is not currently running, then the controller 108 may proceed to start the generator 104. The controller 108 may do so by causing the fuel regulator 240 to feed gaseous fuel to the combustion chamber 230 and by causing the air regulator 250 to blow intake air into the combustion chamber 230. The controller 108 may then cause the igniter 232 to ignite the gaseous fuel to give rise to combustion. The controller 108 may monitor the temperature sensor 260 until a certain operating temperature is reached, and then cause the starting mechanism 274 to initiate motion in the Stirling engine 114. The controller 108 may thereafter monitor the tachometer 262 and wait until a certain operational rate of revolution is reached (the controller 108 may cause the fuel regulator 240 to adjust the amount of gaseous fuel fed to the combustion chamber 230 until the desired rate of revolution is achieved). Once the operational rate of revolution is reached, the controller 108 may cause the system of switches 118 to couple the output of the converter 116 to the input of the conditioner 120 and to couple the output of the conditioner 120 to the electrical infrastructure 110. Electricity is thus provided by the generator 104 to the electrical infrastructure 110 of the site to supplement or replace electricity from the power grid 112. The controller 108 may thereafter update the state information to indicate that the generator 104 is currently running, and that electricity from the generator 104 is currently being provided to the electrical infrastructure 110.

In the above discussion, only electricity from the generator 104 is discussed. It should be noted, however, that electricity from the one or more batteries 132 may also be provided to the electrical infrastructure 110 in response to the message. The electricity from the one or more batteries 132 may be provided in lieu of, or in addition to, the electricity from the generator 104. Thus, when the controller 108 processes the message from the utility provider, the controller 108 may determine whether electricity from the one or more batteries 132 should be provided to the electrical infrastructure 110. If not, then the controller 108 may just operate in the manner described above.

However, if the controller 108 decides to provide electricity from the one or more batteries 132 to the electrical infrastructure 110, then the controller 108 may determine whether the electricity from the one or more batteries 132 should be provided in addition to the electricity from the generator 104. If so, then in addition to performing the operations described above (to provide electricity from the generator 104 to the electrical infrastructure 110), the controller 108 may also cause electricity from the one or more batteries 132 to be provided to the electrical infrastructure 110. To do so, the controller 108 may determine whether electricity from the one or more batteries 132 is already being provided to the electrical infrastructure 110. This determination may be made by checking the state information. If the state information indicates that electricity from the one or more batteries 132 is already being provided to the electrical infrastructure 110, then the controller 108 need not do anything further. However, if electricity from the one or more batteries 132 is not currently being provided to the electrical infrastructure 110, then the controller 108 may cause the system of switches 118 to couple the one or more batteries 132 to the input of the conditioner 120. This will cause electricity from both the generator 104 and the one or more batteries 132 to be provided to the electrical infrastructure 110 to supplement or replace electricity from the power grid 112. This assumes that the same conditioner 120 is used for both the generator 104 and the one or more batteries 132. If separate conditioners 120 are used, then the controller 108 may cause the system of switches 118 to couple the one or more batteries 132 to the input of another conditioner (not shown), and to couple the output of that conditioner to the electrical infrastructure 110. This again will cause electricity from both the generator 104 and the one or more batteries 132 to be provided to the electrical infrastructure 110 to supplement or replace electricity from the power grid 112. Thereafter, the controller 108 may update the state information to indicate that electricity from the one or more batteries 132 is currently being provided to the electrical infrastructure 110.

If the controller 108 decides to provide electricity from the one or more batteries 132 in lieu of electricity from the generator 104, then the controller 108 may forego the operations described above for providing electricity from the generator 104 to the electrical infrastructure 110. Instead, the controller 108 may cause the system of switches 118 to couple the one or more batteries 132 to the input of the conditioner 120 and to couple the output of the conditioner 120 to the electrical infrastructure 110. This will cause electricity from just the one or more batteries 132 to be provided to the electrical infrastructure 110 to supplement or replace electricity from the power grid 112. This assumes that the same conditioner 120 is used for both the generator 104 and the one or more batteries 132. If separate conditioners 120 are used, then the controller 108 may cause the system of switches 118 to couple the one or more batteries 132 to the input of another conditioner (not shown), and to couple the output of that conditioner to the electrical infrastructure 110. This again will cause electricity from just the one or more batteries 132 to be provided to the electrical infrastructure 110 to supplement or replace electricity from the power grid 112. The controller 108 may thereafter update the state information to indicate that electricity from the one or more batteries 132 is currently being provided to the electrical infrastructure 110.

In the manner described, the controller 108 may respond to the message from the utility provider by providing electricity from the generator 104 and/or the one or more batteries 132 to the electrical infrastructure 110.

Halting Provision of Electricity

At some point, the utility provider may determine that the power grid 112 is no longer overtaxed. At that point, the utility provider may send a message to the communication interface 154 of the controller 108 indicating that the EGS 102 should stop providing electricity to the electrical infrastructure 110 of the site. This message may be sent, for example, on a network or on the power grid 112 itself, and it may take the form of one or more packets. The message may be a directed message that is sent only to the communication interface 154 of this EGS 102, or it may be a general message that is sent to all communication interfaces of all EGSs.

The message is processed by the controller 108 (more specifically, by the core logic 150). In response, the controller 108 may determine whether the generator 104 and/or the one or more batteries 132 are currently providing electricity to the electrical infrastructure 110. This determination may be made by checking the state information. If the state information indicates that neither the generator 104 nor the one or more batteries 132 are currently providing electricity to the electrical infrastructure 110, then the controller 108 may choose to ignore this message.

However, if the controller 108 determines that at least one of the generator 104 and the one or more batteries 132 is currently providing electricity to the electrical infrastructure 110, then the controller 108 may cause the system of switches 118 to decouple the outputs of all conditioners 120 from the electrical infrastructure 110. By doing so, the controller 108 halts the provision of all electricity from the EGS 102 to the electrical infrastructure 110. In addition, the controller 108 may cause the system of switches 118 to decouple the output of the converter 116 from the input of the conditioner 120 (if they are currently coupled) and to decouple the one or more batteries 132 from all components except for the charger 130 (if the one or more batteries are currently coupled to any components). The controller 108 may thereafter update the state information to indicate that the generator 104 is not currently providing electricity to the electrical infrastructure 110, and that the one or more batteries 132 are not currently providing electricity to the electrical infrastructure 110.

In addition, the controller 120 may determine whether the generator 104 is currently running. This may be done by checking the state information. If the generator 104 is not currently running, nothing further needs to be done. However, if the generator 104 is currently running, then the controller 108 may determine whether to keep the generator 104 running. The controller 108 may keep the generator 104 running, for example, to charge the one or more batteries 132. If the controller 108 decides to keep the generator 104 running, then the controller 108 may cause the system of switches 118 to couple the output of the converter 116 to the charger 130 to enable the charger 130 to use the electricity from the generator 104 to charge the one or more batteries 132. If the controller 108 does so, it may update the state information to indicate that the one or more batteries 132 are currently being charged. On the other hand, if the controller 108 decides to turn off the generator 104, then the controller 108 may cause the fuel regulator 240 to stop feeding gaseous fuel to the combustion chamber 230 and cause the air regulator 250 to stop blowing air into the combustion chamber 230. Without a heat source, the Stirling engine 114 will eventually stop operating. Thereafter, the controller 108 may update the state information to indicate that the generator 104 is not currently running.

In the manner described, the controller 108 may cause the EGS 102 to stop providing electricity to the electrical infrastructure 110 in response to a message from the utility provider.

Load Based Operation

In one embodiment, the controller 108 may control the operation of the EGS 102 based upon the electrical load that is imposed on the electrical infrastructure 110 of the site. The controller 108 may determine the electrical load based upon information received from the one or more load sensors 122. This load can change significantly throughout the course of a day. For example, the load may increase significantly when a clothes dryer is turned on or when an air conditioning unit is activated. The load may also significantly increase when an electric car is being charged. Because the load can vary greatly over time, it may be desirable to control the operation of the EGS 102 based upon the load so that the EGS 102 can adapt its behavior to accommodate the varying loads. For example, if the electrical load exceeds one or more thresholds, then the controller 108 may cause electricity from the generator 104 and/or the one or more batteries 132 to be provided to the electrical infrastructure 110.

Several thresholds may be established. For example, for loads below a first threshold, the controller 108 may not provide any electricity from the EGS 102 to the electrical infrastructure 110 but rather may leave it to the power grid 112 to handle the load. For loads between the first threshold and a second higher threshold, the controller 108 may cause electricity from just the generator 104 to be provided to the electrical infrastructure 110 to supplement or replace electricity from the power grid 112. For loads above the second threshold, the controller 108 may cause electricity from both the generator 104 and the one or more batteries 132 to be provided to the electrical infrastructure 110 to supplement or replace electricity from the power grid 112. These thresholds may be provided to the controller 108 in various ways. For example, they may be provided via the user interface components 152 (e.g. manual entry), via the communication interface(s) 154 (through one or more messages), via the peripheral(s) 156 (e.g. as a file transfer using a USB port, etc.), or via some other means.

In the following example, it will be assumed that the two threshold approach summarized above is implemented. However, it should be noted that more or fewer threshold values may be used, and that operation of the EGS 102 may vary. Such variations are within the scope of the present invention.

Operation when Load is Below a First Threshold

As noted above, the controller 108 can determine the electrical load currently imposed on the electrical infrastructure 110 of the site based upon information received from the one or more load sensors 122. Upon determining that the electrical load is below a first threshold, the controller 108 may operate as follows.

The controller 108 may determine, based upon the state information, whether electricity from the one or more batteries 132 is currently being provided to the electrical infrastructure 110. This may be the case, for example, if the load was at a level above a second threshold but has now dropped to a level below a first threshold. If electricity from the one or more batteries 132 is currently being provided to the electrical infrastructure 110, then the controller 108 may cause the system of switches 118 to decouple the one or more batteries 132 from the input of the conditioner 120. This causes electricity from the one or more batteries 132 to no longer be provided to the electrical infrastructure 110. In the case where a separate conditioner (not shown) is provided for the one or more batteries 132, the controller 108 may cause the system of switches 118 to decouple the one or more batteries 132 from the input of the separate conditioner and to decouple the output of the separate conditioner from the electrical infrastructure 110. This again causes electricity from the one or more batteries 132 to no longer be provided to the electrical infrastructure 110. Thereafter, the controller 108 may update the state information to indicate that electricity from the one or more batteries 132 is not currently being provided to the electrical infrastructure 110.

The controller 108 may further determine, based upon the state information, whether electricity from the generator 104 is currently being provided to the electrical infrastructure 110. If not, then no further action is needed.

However, if electricity from the generator 104 is currently being provided to the electrical infrastructure 110 (which may be the case, for example, if the load was at a level above a first threshold but has now dropped to a level below the first threshold), then the controller 108 may determine whether the load is at least a certain buffer amount below the first threshold. If not, then the controller 108 may allow the generator 104 to keep providing electricity to the electrical infrastructure 110. Implementing this buffer amount helps to ensure that only significant changes in load will cause the controller 108 to stop providing electricity from the generator 104 to the electrical infrastructure 110. If, on the other hand, the controller 108 determines that the load is at least a certain buffer amount below the first threshold, then the controller 108 may cause the system of switches 118 to decouple the output of the converter 116 from the input of the conditioner 120 and to decouple the output of the conditioner 120 from the electrical infrastructure 110. This causes electricity from the generator 104 to no longer be provided to the electrical infrastructure 110. The controller 108 may thereafter update the state information to indicate that electricity from the generator 104 is not currently being provided to the electrical infrastructure 110.

In addition, the controller 108 may determine whether to keep the generator 104 running. The controller 108 may keep the generator 104 running, for example, to charge the one or more batteries 132. If the controller 108 decides to keep the generator 104 running, then the controller 108 may cause the system of switches 118 to couple the output of the converter 116 to the charger 130 to enable the charger 130 to use the electricity from the generator 104 to charge the one or more batteries 132. If the controller 108 does so, it may update the state information to indicate that the one or more batteries 132 are currently being charged.

On the other hand, if the controller 108 decides to turn off the generator 104, then the controller 108 may cause the fuel regulator 240 to stop feeding gaseous fuel to the combustion chamber 230 and cause the air regulator 250 to stop blowing air into the combustion chamber 230. Without a heat source, the Stirling engine 114 will eventually stop operating. Thereafter, the controller 108 may update the state information to indicate that the generator 104 is not currently running.

Operation when Load is Between a First Threshold and a Second Threshold

If the controller 108 determines that the load currently imposed on the electrical infrastructure 110 is between a first threshold and a second, higher threshold, the controller 108 may operate as follows.

The controller 108 may determine, based upon the state information, whether electricity from the one or more batteries 132 is currently being provided to the electrical infrastructure 110. This may be the case, for example, if the load was at a level above a second threshold but has now dropped to a level between a first threshold and the second threshold. If electricity from the one or more batteries 132 is currently being provided to the electrical infrastructure 110, then the controller 108 may determine whether the load is at least a certain buffer amount below the second threshold (this buffer amount may be the same as or different from the buffer amount discussed above in connection with the first threshold). If not, then the controller 108 may allow the one or more batteries 132 to keep providing electricity to the electrical infrastructure 110. Implementing this buffer amount helps to ensure that only significant changes in load will cause the controller 108 to stop providing electricity from the one or more batteries 132 to the electrical infrastructure 110. If, on the other hand, the controller 108 determines that the load is at least a certain buffer amount below the second threshold, then the controller 108 may cause the system of switches 118 to decouple the one or more batteries 132 from the input of the conditioner 120. This causes electricity from the one or more batteries 132 to no longer be provided to the electrical infrastructure 110. In the case where a separate conditioner (not shown) is provided for the one or more batteries 132, the controller 108 may cause the system of switches 118 to decouple the one or more batteries 132 from the input of the separate conditioner and to decouple the output of the separate conditioner from the electrical infrastructure 110. This again causes electricity from the one or more batteries 132 to no longer be provided to the electrical infrastructure 110. The controller 108 may thereafter update the state information to indicate that electricity from the one or more batteries 132 is not currently being provided to the electrical infrastructure 110.

The controller 108 may further determine, based upon the state information, whether electricity from the generator 104 is currently being provided to the electrical infrastructure 110. If not, then the controller 108 may determine, based upon the state information, whether the generator 104 is currently running (the generator 104 may be currently running, for example, because the one or more batteries are currently being charged). If the generator 104 is currently running, then the controller 108 may cause the system of switches 118 to couple the output of the converter 116 to the input of the conditioner 120 and to couple the output of the conditioner 120 to the electrical infrastructure 110. This causes electricity from the generator 104 to be provided to the electrical infrastructure 110 of the site to supplement or replace electricity from the power grid 112. The controller 108 may thereafter update the state information to indicate that electricity from the generator 104 is currently being provided to the electrical infrastructure 110.

If, on the other hand, the controller 108 determines that the generator 104 is not currently running, then the controller 108 may proceed to start the generator 104. The controller 108 may do so by causing the fuel regulator 240 to feed gaseous fuel to the combustion chamber 230 and by causing the air regulator 250 to blow intake air into the combustion chamber 230. The controller 108 may then cause the igniter 232 to ignite the gaseous fuel to give rise to combustion. The controller 108 may monitor the temperature sensor 260 until a certain operating temperature is reached, and then cause the starting mechanism 274 to initiate motion in the Stirling engine 114. The controller 108 may thereafter monitor the tachometer 262 and wait until a certain operational rate of revolution is reached (the controller 108 may cause the fuel regulator 240 to adjust the amount of gaseous fuel fed to the combustion chamber 230 until the desired rate of revolution is achieved). Once the operational rate of revolution is reached, the controller 108 may cause the system of switches 118 to couple the output of the converter 116 to the input of the conditioner 120 and to couple the output of the conditioner 120 to the electrical infrastructure 110. Electricity is thus provided by the generator 104 to the electrical infrastructure 110 of the site to supplement or replace electricity from the power grid 112. The controller 108 may thereafter update the state information to indicate that the generator 104 is currently running, and that electricity from the generator 104 is currently being provided to the electrical infrastructure 110.

Dynamic Load Based Adjustment

After the controller 108 causes electricity from the generator 104 to be provided to the electrical infrastructure 110 (or if electricity from the generator 104 is already being provided to the electrical infrastructure 110), the controller 108 may adjust the operation of the generator 104 to dynamically adapt to the load.

To elaborate, the difference between the first threshold and the second threshold may be large. Thus, a load at the second threshold may be significantly larger than a load at the first threshold. These loads may need significantly different amounts of electricity in order to be satisfied. In one embodiment, the controller 108 adjusts the operation of the generator 104 based upon the load to adjust the amount of electricity produced by the generator 104. By doing so, the controller 108 causes the generator 104 to generate an amount of electricity that is appropriate for the load. The load imposed on the electrical infrastructure 110 has little to do with the power grid 112. Thus, the sample operation described in this section may be carried out regardless of whether the electrical infrastructure 110 is coupled to a power grid 112.

The amount of electricity produced by the generator 104 is a function of the amount of mechanical motion produced by the Stirling engine 114. A measure of this mechanical motion is provided, for example, by the tachometer 262, and may be expressed in terms of a number of revolutions per minute (RPM) of the flywheel 212 (or crankshaft 210). The RPM of the flywheel 212 is in turn determined, at least in part, by the amount of heat produced in the combustion chamber 230, which in turn is determined, at least in part, by the amount of gaseous fuel and the amount of air fed to the combustion chamber 230. Thus, by adjusting the amount of gaseous fuel (and perhaps the amount of air) fed to the combustion chamber 230, the controller 108 can adjust the RPM of the flywheel 212, thereby adjusting the amount of electricity generated by the generator 104. Alternatively, the controller 108 can adjust the amount of electricity produced by the generator 104 by increasing torque while holding the RPM constant.

In one embodiment, each load has a corresponding RPM. The RPM corresponding to a load represents the RPM that the flywheel 212 has to achieve in order for the generator 104 to generate enough electricity to support that load. Thus, a load at the first threshold has a first corresponding RPM, a load at the second threshold has a second and higher corresponding RPM, and loads between the first and second thresholds have their own different corresponding RPMs. In one embodiment, correlation information specifying the corresponding RPM for each load of a plurality of loads is provided to the controller 108. This correlation information may be provided to the controller 108 via the user interface components 152 (e.g. manually entered), via the communication interface(s) 154 (e.g. through one or more messages), via the peripheral(s) 156 (e.g. through a file transfer using a USB port), or some other means. The correlation information may be stored, for example, in a persistent storage. Armed with this correlation information, the controller 108 can cause the generator 104 to generate the proper amount of electricity for each load.

For example, suppose that the controller 108 receives information from the one or more load sensors 122 indicating that the load currently imposed on the electrical infrastructure 110 of the site is a load X, which is between the first and second thresholds. In response, the controller 108 may access the correlation information and determine the RPM corresponding to load X. The RPM corresponding to load X will be referred to as the target RPM. The controller 108 may then determine, based upon information from the tachometer 262, a current RPM of the flywheel 212.

If the current RPM is lower than the target RPM, then the controller 108 may cause the fuel regulator 240 to feed more fuel to the combustion chamber 230. The controller 108 may also cause the air regulator 250 to blow more air into the combustion chamber 230. The controller 108 may thereafter monitor information from the tachometer 262 to determine whether the target RPM has been reached. The controller 108 may continue to cause the fuel regulator 240 to feed more fuel, cause the air regulator 250 to blow more air, and monitor information from the tachometer 262 until the target RPM is reached.

If, on the other hand, the current RPM is higher than the target RPM, then the controller 108 may cause the fuel regulator 240 to feed less fuel to the combustion chamber 230. The controller 108 may also cause the air regulator 250 to blow less air into the combustion chamber 230. The controller 108 may thereafter monitor information from the tachometer 262 to determine whether the target RPM has been reached. The controller 108 may continue to cause the fuel regulator 240 to feed less fuel, cause the air regulator 250 to blow less air, and monitor information from the tachometer 262 until the target RPM is reached.

In the manner described, the controller 108 causes the operation of the generator 104 to change to dynamically adapt to the load imposed on the electrical infrastructure 110 of the site.

Operation when Load is Above a Second Threshold

If the controller 108 determines that the load on the electrical infrastructure 110 is above a second threshold, the controller 108 may operate as follows.

The controller 108 may determine, based upon the state information, whether electricity from the one or more batteries 132 is currently being provided to the electrical infrastructure 110. If not, then the controller 108 may cause the system of switches 118 to couple the one or more batteries 132 to the input of the conditioner 120. In the case where a separate conditioner (not shown) is provided for the one or more batteries 132, the controller 108 may cause the system of switches 118 to couple the one or more batteries 132 to the input of the separate conditioner and to couple the output of the separate conditioner to the electrical infrastructure 110. This causes electricity from the one or more batteries 132 to be provided to the electrical infrastructure 110 to supplement or replace electricity from the power grid 112. The controller 108 may thereafter update the state information to indicate that electricity from the one or more batteries 132 is currently being provided to the electrical infrastructure 110.

The controller 108 may further determine, based upon the state information, whether electricity from the generator 104 is currently being provided to the electrical infrastructure 110. If not (which may be the case, for example, if the load was at a level below a first threshold but jumped to a level above a second threshold), then the controller 108 may determine, based upon the state information, whether the generator 104 is currently running (the generator 104 may be currently running, for example, because the one or more batteries are currently being charged). If the generator 104 is currently running, then the controller 108 may cause the system of switches 118 to couple the output of the converter 116 to the input of the conditioner 120 and to couple the output of the conditioner 120 to the electrical infrastructure 110. This causes electricity from the generator 104 to be provided to the electrical infrastructure 110 of the site to supplement or replace electricity from the power grid 112. The controller 108 may thereafter update the state information to indicate that electricity from the generator 104 is currently being provided to the electrical infrastructure 110.

If, on the other hand, the controller 108 determines that the generator 104 is not currently running, then the controller 108 may proceed to start the generator 104. The controller 108 may do so by causing the fuel regulator 240 to feed gaseous fuel to the combustion chamber 230 and by causing the air regulator 250 to blow intake air into the combustion chamber 230. The controller 108 may then cause the igniter 232 to ignite the gaseous fuel to give rise to combustion. The controller 108 may monitor the temperature sensor 260 until a certain operating temperature is reached, and then cause the starting mechanism 274 to initiate motion in the Stirling engine 114. The controller 108 may thereafter monitor the tachometer 262 and wait until a certain operational rate of revolution is reached (the controller 108 may cause the fuel regulator 240 to adjust the amount of gaseous fuel fed to the combustion chamber 230 until the desired rate of revolution is achieved). Once the operational rate of revolution is reached, the controller 108 may cause the system of switches 118 to couple the output of the converter 116 to the input of the conditioner 120 and to couple the output of the conditioner 120 to the electrical infrastructure 110. Electricity is thus provided by the generator 104 to the electrical infrastructure 110 of the site to supplement or replace electricity from the power grid 112. The controller 108 may thereafter update the state information to indicate that the generator 104 is currently running, and that electricity from the generator 104 is currently being provided to the electrical infrastructure 110.

After the controller 108 causes electricity from the generator 104 to be provided to the electrical infrastructure 110 (or if electricity from the generator 104 is already being provided to the electrical infrastructure 110), the controller 108 may adjust the operation of the generator 104 to cause the generator 104 to operate at an RPM that corresponds to a load that is at the level of the second threshold (this RPM may represent the maximum RPM for the generator 104). The controller 108 may do so by accessing the correlation information and determining the RPM that corresponds to a load at the level of the second threshold. This RPM will be referred to as the target RPM. The controller 108 may then determine, based upon information from the tachometer 262, a current RPM of the flywheel 212.

If the current RPM is lower than the target RPM, then the controller 108 may cause the fuel regulator 240 to feed more fuel to the combustion chamber 230. The controller 108 may also cause the air regulator 250 to blow more air into the combustion chamber 230. The controller 108 may thereafter monitor information from the tachometer 262 to determine whether the target RPM has been reached. The controller 108 may continue to cause the fuel regulator 240 to feed more fuel, cause the air regulator 250 to blow more air, and monitor information from the tachometer 262 until the target RPM is reached.

If, on the other hand, the current RPM is higher than the target RPM (which usually should not occur), then the controller 108 may cause the fuel regulator 240 to feed less fuel to the combustion chamber 230. The controller 108 may also cause the air regulator 250 to blow less air into the combustion chamber 230. The controller 108 may thereafter monitor information from the tachometer 262 to determine whether the target RPM has been reached. The controller 108 may continue to cause the fuel regulator 240 to feed less fuel, cause the air regulator 250 to blow less air, and monitor information from the tachometer 262 until the target RPM is reached.

In the manner described, the controller 108 may control the operation of the EGS 102 so as to adapt to the load currently imposed on the electrical infrastructure 110 of the site.

Capacity Based Operation

In one embodiment, the controller 108 may control the operation of the EGS 102 based upon the electrical capacity that is currently being provided by the power grid 112. The controller 108 may determine the electrical capacity based upon information received from the one or more capacity sensors 124. The electrical capacity of the power grid 112 may vary over time for a variety of reasons. For example, during times of heavy electricity usage, the net available electrical capacity of the power grid 112 may be reduced. If one of the power plants of the utility provider goes down, the electrical capacity may be reduced. During times of outage, the electrical capacity may be reduced to nothing. For these and other reasons, the electrical capacity of the power grid 112 can vary greatly over time. That being the case, it may be desirable to control the operation of the EGS 102 based upon the electrical capacity of the power grid 112 so that the EGS 102 can adapt its behavior to accommodate the varying capacities. As an example, if the electrical capacity falls below one or more thresholds, the controller 108 may cause electricity from the generator 104 and/or the one or more batteries 132 to be provided to the electrical infrastructure 110.

Several thresholds may be established. For example, for electrical capacities above a first threshold, the controller 108 may not provide any electricity from the EGS 102 to the electrical infrastructure 110 but rather may leave it to the power grid 112 to provide electricity to the electrical infrastructure 110. For electrical capacities between the first threshold and a second lower threshold, the controller 108 may cause electricity from just the generator 104 to be provided to the electrical infrastructure 110. For electrical capacities below the second threshold, the controller 108 may cause electricity from both the generator 104 and the one or more batteries 132 to be provided to the electrical infrastructure 110. These thresholds may be provided to the controller 108 in various ways. For example, they may be provided via the user interface components 152 (e.g. manual entry), via the communication interface(s) 154 (through one or more messages), via the peripheral(s) 156 (e.g. as a file transfer using a USB port, etc.), or via some other means.

In the following example, it will be assumed that the two threshold approach summarized above is implemented. However, it should be noted that more or fewer threshold values may be used, and that operation of the EGS 102 may vary. Such variations are within the scope of the present invention.

Operation when Capacity is Above a First Threshold

As noted above, the controller 108 can determine the electrical capacity currently provided by the power grid 112 based upon information received from the one or more capacity sensors 124. Upon determining that the electrical capacity is above a first threshold, the controller 108 may operate as follows.

The controller 108 may determine, based upon the state information, whether electricity from the one or more batteries 132 is currently being provided to the electrical infrastructure 110. This may be the case, for example, if the capacity was at a level below a second threshold but has now risen to a level above a first threshold. If electricity from the one or more batteries 132 is currently being provided to the electrical infrastructure 110, then the controller 108 may cause the system of switches 118 to decouple the one or more batteries 132 from the input of the conditioner 120. This causes electricity from the one or more batteries 132 to no longer be provided to the electrical infrastructure 110. In the case where a separate conditioner (not shown) is provided for the one or more batteries 132, the controller 108 may cause the system of switches 118 to decouple the one or more batteries 132 from the input of the separate conditioner and to decouple the output of the separate conditioner from the electrical infrastructure 110. This again causes electricity from the one or more batteries 132 to no longer be provided to the electrical infrastructure 110. Thereafter, the controller 108 may update the state information to indicate that electricity from the one or more batteries 132 is not currently being provided to the electrical infrastructure 110.

The controller 108 may further determine, based upon the state information, whether electricity from the generator 104 is currently being provided to the electrical infrastructure 110. If not, then no further action is needed.

However, if electricity from the generator 104 is currently being provided to the electrical infrastructure 110 (which may be the case, for example, if the capacity was at a level below a first threshold but has now risen to a level above the first threshold), then the controller 108 may determine whether the capacity is at least a certain buffer amount above the first threshold. If not, then the controller 108 may allow the generator 104 to keep providing electricity to the electrical infrastructure 110. Implementing this buffer amount helps to ensure that only significant changes in capacity will cause the controller 108 to stop providing electricity from the generator 104 to the electrical infrastructure 110. If, on the other hand, the controller 108 determines that the capacity is at least a certain buffer amount above the first threshold, then the controller 108 may cause the system of switches 118 to decouple the output of the converter 116 from the input of the conditioner 120 and to decouple the output of the conditioner 120 from the electrical infrastructure 110. This causes electricity from the generator 104 to no longer be provided to the electrical infrastructure 110. The controller 108 may thereafter update the state information to indicate that electricity from the generator 104 is not currently being provided to the electrical infrastructure 110.

In addition, the controller 108 may determine whether to keep the generator 104 running. The controller 108 may keep the generator 104 running, for example, to charge the one or more batteries 132. If the controller 108 decides to keep the generator 104 running, then the controller 108 may cause the system of switches 118 to couple the output of the converter 116 to the charger 130 to enable the charger 130 to use the electricity from the generator 104 to charge the one or more batteries 132. If the controller 108 does so, it may update the state information to indicate that the one or more batteries 132 are currently being charged.

On the other hand, if the controller 108 decides to turn off the generator 104, then the controller 108 may cause the fuel regulator 240 to stop feeding gaseous fuel to the combustion chamber 230 and cause the air regulator 250 to stop blowing air into the combustion chamber 230. Without a heat source, the Stirling engine 114 will eventually stop operating. Thereafter, the controller 108 may update the state information to indicate that the generator 104 is not currently running.

Operation when Capacity is Between a First Threshold and a Second Threshold

If the controller 108 determines that the electrical capacity currently provided by the power grid 112 is between a first threshold and a second, lower threshold, the controller 108 may operate as follows.

The controller 108 may determine, based upon the state information, whether electricity from the one or more batteries 132 is currently being provided to the electrical infrastructure 110. This may be the case, for example, if the capacity was at a level below a second threshold but has now risen to a level between a first threshold and the second threshold. If electricity from the one or more batteries 132 is currently being provided to the electrical infrastructure 110, then the controller 108 may determine whether the capacity is at least a certain buffer amount above the second threshold (this buffer amount may be the same as or different from the buffer amount discussed above in connection with the first threshold). If not, then the controller 108 may allow the one or more batteries 132 to keep providing electricity to the electrical infrastructure 110. Implementing this buffer amount helps to ensure that only significant changes in capacity will cause the controller 108 to stop providing electricity from the one or more batteries 132 to the electrical infrastructure 110. If, on the other hand, the controller 108 determines that the capacity is at least a certain buffer amount above the second threshold, then the controller 108 may cause the system of switches 118 to decouple the one or more batteries 132 from the input of the conditioner 120. This causes electricity from the one or more batteries 132 to no longer be provided to the electrical infrastructure 110. In the case where a separate conditioner (not shown) is provided for the one or more batteries 132, the controller 108 may cause the system of switches 118 to decouple the one or more batteries 132 from the input of the separate conditioner and to decouple the output of the separate conditioner from the electrical infrastructure 110. This again causes electricity from the one or more batteries 132 to no longer be provided to the electrical infrastructure 110. The controller 108 may thereafter update the state information to indicate that electricity from the one or more batteries 132 is not currently being provided to the electrical infrastructure 110.

The controller 108 may further determine, based upon the state information, whether electricity from the generator 104 is currently being provided to the electrical infrastructure 110. If not, then the controller 108 may determine, based upon the state information, whether the generator 104 is currently running (the generator 104 may be currently running, for example, because the one or more batteries are currently being charged). If the generator 104 is currently running, then the controller 108 may cause the system of switches 118 to couple the output of the converter 116 to the input of the conditioner 120 and to couple the output of the conditioner 120 to the electrical infrastructure 110. This causes electricity from the generator 104 to be provided to the electrical infrastructure 110 of the site to supplement or replace electricity from the power grid 112. The controller 108 may thereafter update the state information to indicate that electricity from the generator 104 is currently being provided to the electrical infrastructure 110.

If, on the other hand, the controller 108 determines that the generator 104 is not currently running, then the controller 108 may proceed to start the generator 104. The controller 108 may do so by causing the fuel regulator 240 to feed gaseous fuel to the combustion chamber 230 and by causing the air regulator 250 to blow intake air into the combustion chamber 230. The controller 108 may then cause the igniter 232 to ignite the gaseous fuel to give rise to combustion. The controller 108 may monitor the temperature sensor 260 until a certain operating temperature is reached, and then cause the starting mechanism 274 to initiate motion in the Stirling engine 114. The controller 108 may thereafter monitor the tachometer 262 and wait until a certain operational rate of revolution is reached (the controller 108 may cause the fuel regulator 240 to adjust the amount of gaseous fuel fed to the combustion chamber 230 until the desired rate of revolution is achieved). Once the operational rate of revolution is reached, the controller 108 may cause the system of switches 118 to couple the output of the converter 116 to the input of the conditioner 120 and to couple the output of the conditioner 120 to the electrical infrastructure 110. Electricity is thus provided by the generator 104 to the electrical infrastructure 110 of the site to supplement or replace electricity from the power grid 112. The controller 108 may thereafter update the state information to indicate that the generator 104 is currently running, and that electricity from the generator 104 is currently being provided to the electrical infrastructure 110.

Dynamic Capacity Based Adjustment

After the controller 108 causes electricity from the generator 104 to be provided to the electrical infrastructure 110 (or if electricity from the generator 104 is already being provided to the electrical infrastructure 110), the controller 108 may adjust the operation of the generator 104 to dynamically adapt to the capacity.

To elaborate, the difference between the first threshold and the second threshold may be large. Thus, a capacity at the second threshold may be significantly lower than a capacity at the first threshold. As a result, significantly different amounts of electricity may be needed to compensate for these different capacities. In one embodiment, the controller 108 adjusts the operation of the generator 104 based upon the capacity to adjust the amount of electricity produced by the generator 104. By doing so, the controller 108 causes the generator 104 to generate an amount of electricity that is appropriate to compensate for each particular capacity.

As explained previously, the amount of electricity produced by the generator 104 is a function of the amount of mechanical motion produced by the Stirling engine 114. A measure of this mechanical motion is provided, for example, by the tachometer 262, and may be expressed in terms of a number of revolutions per minute (RPM) of the flywheel 212 (or crankshaft 210). The RPM of the flywheel 212 is in turn determined, at least in part, by the amount of heat produced in the combustion chamber 230, which in turn is determined, at least in part, by the amount of gaseous fuel and the amount of air fed to the combustion chamber 230. Thus, by adjusting the amount of gaseous fuel (and perhaps the amount of air) fed to the combustion chamber 230, the controller 108 can adjust the RPM of the flywheel 212, thereby adjusting the amount of electricity generated by the generator 104. Alternatively, the controller 108 can adjust the amount of electricity produced by the generator 104 by increasing torque while holding the RPM constant.

In one embodiment, each capacity has a corresponding RPM. The RPM corresponding to a capacity represents the RPM that the flywheel 212 has to achieve in order for the generator 104 to generate enough electricity to compensate for that capacity. Thus, a capacity at the first threshold has a first corresponding RPM, a capacity at the second threshold has a second and higher corresponding RPM, and capacities between the first and second thresholds have their own different corresponding RPMs. In one embodiment, correlation information specifying the corresponding RPM for each capacity of a plurality of capacities is provided to the controller 108. This correlation information may be provided to the controller 108 via the user interface components 152 (e.g. manually entered), via the communication interface(s) 154 (e.g. through one or more messages), via the peripheral(s) 156 (e.g. through a file transfer using a USB port), or some other means. The correlation information may be stored, for example, in a persistent storage. Armed with this correlation information, the controller 108 can cause the generator 104 to generate the proper amount of electricity for each capacity.

For example, suppose that the controller 108 receives information from the one or more capacity sensors 124 indicating that the capacity currently provided by the power grid 112 is a capacity X, which is between the first and second thresholds. In response, the controller 108 may access the correlation information and determine the RPM corresponding to capacity X. The RPM corresponding to capacity X will be referred to as the target RPM. The controller 108 may then determine, based upon information from the tachometer 262, a current RPM of the flywheel 212.

If the current RPM is lower than the target RPM, then the controller 108 may cause the fuel regulator 240 to feed more fuel to the combustion chamber 230. The controller 108 may also cause the air regulator 250 to blow more air into the combustion chamber 230. The controller 108 may thereafter monitor information from the tachometer 262 to determine whether the target RPM has been reached. The controller 108 may continue to cause the fuel regulator 240 to feed more fuel, cause the air regulator 250 to blow more air, and monitor information from the tachometer 262 until the target RPM is reached.

If, on the other hand, the current RPM is higher than the target RPM, then the controller 108 may cause the fuel regulator 240 to feed less fuel to the combustion chamber 230. The controller 108 may also cause the air regulator 250 to blow less air into the combustion chamber 230. The controller 108 may thereafter monitor information from the tachometer 262 to determine whether the target RPM has been reached. The controller 108 may continue to cause the fuel regulator 240 to feed less fuel, cause the air regulator 250 to blow less air, and monitor information from the tachometer 262 until the target RPM is reached.

In the manner described, the controller 108 causes the operation of the generator 104 to change to dynamically adapt to the varying capacities provided by the power grid 112.

Operation when Capacity is Below a Second Threshold

If the controller 108 determines that the electrical capacity provided by the power grid 112 is below a second threshold, the controller 108 may operate as follows.

The controller 108 may determine, based upon the state information, whether electricity from the one or more batteries 132 is currently being provided to the electrical infrastructure 110. If not, then the controller 108 may cause the system of switches 118 to couple the one or more batteries 132 to the input of the conditioner 120 and to couple the output of the conditioner 120 to the electrical infrastructure 110. This causes electricity from the one or more batteries 132 to be provided to the electrical infrastructure 110 to supplement or replace electricity from the power grid 112. In the case where a separate conditioner (not shown) is provided for the one or more batteries 132, the controller 108 may cause the system of switches 118 to couple the one or more batteries 132 to the input of the separate conditioner and to couple the output of the separate conditioner to the electrical infrastructure 110. This again causes electricity from the one or more batteries 132 to be provided to the electrical infrastructure 110 to supplement or replace electricity from the power grid 112. The controller 108 may thereafter update the state information to indicate that electricity from the one or more batteries 132 is currently being provided to the electrical infrastructure 110.

The controller 108 may further determine, based upon the state information, whether electricity from the generator 104 is currently being provided to the electrical infrastructure 110. If not (which may be the case, for example, if the capacity was at a level above a first threshold but dropped to a level below a second threshold), then the controller 108 may determine, based upon the state information, whether the generator 104 is currently running (the generator 104 may be currently running, for example, because the one or more batteries are currently being charged). If the generator 104 is currently running, then the controller 108 may cause the system of switches 118 to couple the output of the converter 116 to the input of the conditioner 120 and to couple the output of the conditioner 120 to the electrical infrastructure 110. This causes electricity from the generator 104 to be provided to the electrical infrastructure 110 of the site to supplement or replace electricity from the power grid 112. The controller 108 may thereafter update the state information to indicate that electricity from the generator 104 is currently being provided to the electrical infrastructure 110.

If, on the other hand, the controller 108 determines that the generator 104 is not currently running, then the controller 108 may proceed to start the generator 104. The controller 108 may do so by causing the fuel regulator 240 to feed gaseous fuel to the combustion chamber 230 and by causing the air regulator 250 to blow intake air into the combustion chamber 230. The controller 108 may then cause the igniter 232 to ignite the gaseous fuel to give rise to combustion. The controller 108 may monitor the temperature sensor 260 until a certain operating temperature is reached, and then cause the starting mechanism 274 to initiate motion in the Stirling engine 114. The controller 108 may thereafter monitor the tachometer 262 and wait until a certain operational rate of revolution is reached (the controller 108 may cause the fuel regulator 240 to adjust the amount of gaseous fuel fed to the combustion chamber 230 until the desired rate of revolution is achieved). Once the operational rate of revolution is reached, the controller 108 may cause the system of switches 118 to couple the output of the converter 116 to the input of the conditioner 120 and to couple the output of the conditioner 120 to the electrical infrastructure 110. Electricity is thus provided by the generator 104 to the electrical infrastructure 110 of the site to supplement or replace electricity from the power grid 112. The controller 108 may thereafter update the state information to indicate that the generator 104 is currently running, and that electricity from the generator 104 is currently being provided to the electrical infrastructure 110.

After the controller 108 causes electricity from the generator 104 to be provided to the electrical infrastructure 110 (or if electricity from the generator 104 is already being provided to the electrical infrastructure 110), the controller 108 may adjust the operation of the generator 104 to cause the generator 104 to operate at an RPM that corresponds to a capacity that is at the level of the second threshold (this RPM may represent the maximum RPM for the generator 104). The controller 108 may do so by accessing the correlation information and determining the RPM that corresponds to a capacity at the level of the second threshold. This RPM will be referred to as the target RPM. The controller 108 may then determine, based upon information from the tachometer 262, a current RPM of the flywheel 212.

If the current RPM is lower than the target RPM, then the controller 108 may cause the fuel regulator 240 to feed more fuel to the combustion chamber 230. The controller 108 may also cause the air regulator 250 to blow more air into the combustion chamber 230. The controller 108 may thereafter monitor information from the tachometer 262 to determine whether the target RPM has been reached. The controller 108 may continue to cause the fuel regulator 240 to feed more fuel, cause the air regulator 250 to blow more air, and monitor information from the tachometer 262 until the target RPM is reached.

If, on the other hand, the current RPM is higher than the target RPM (which usually should not occur), then the controller 108 may cause the fuel regulator 240 to feed less fuel to the combustion chamber 230. The controller 108 may also cause the air regulator 250 to blow less air into the combustion chamber 230. The controller 108 may thereafter monitor information from the tachometer 262 to determine whether the target RPM has been reached. The controller 108 may continue to cause the fuel regulator 240 to feed less fuel, cause the air regulator 250 to blow less air, and monitor information from the tachometer 262 until the target RPM is reached.

Operation when an Outage is Detected

In the above example, the second threshold may be set at an outage level (i.e. the capacity level that would be exhibited when the power grid 112 is experiencing an outage) or it may be set at a capacity level that is substantially higher than an outage level. With the second threshold set at a non-outage level, the controller 108 may cause electricity from both the generator 104 and the one or more batteries 132 to be provided to the electrical infrastructure 1120 even when an outage is not being experienced. Where the second threshold is set at a non-outage level, a third threshold may be set which would represent the outage level. In response to detecting a capacity at the third threshold (i.e. in response to detecting an outage), the controller 108 may control the EGS 102 in the same manner as that described above for a capacity level below the second threshold. In response to an outage, the controller 108 may make it a special point to cause electricity from the one or more batteries 132 to be provided to the electrical infrastructure 110 immediately. Doing so may prevent any power interruption at the site, which in turn may prevent certain adverse consequences and inconveniences (e.g. losing data, having to reset clocks, having to restart equipment, etc.) from being suffered.

In the manner described, the controller 108 may control the operation of the EGS 102 so as to adapt to the electrical capacity provided by the power grid 112.

Cost Based Operation

In one embodiment, the controller 108 may control the operation of the EGS 102 based on cost considerations. For example, if the cost of electricity from the power grid 112 would be higher than the cost of having the EGS 102 generate the electricity, then the controller 108 may choose to have the EGS 102 generate the electricity. The cost of electricity from the power grid 112 may vary depending upon date and time. For example, the cost may be higher during peak usage times and lower during non-peak times. Thus, the controller 108 may choose to have the EGS 102 generate electricity for the site at certain times and not at other times. The cost of electricity from the power grid 112 may be specified in a rate schedule, which sets forth specific time periods and the cost of electricity during each time period. This rate schedule may be provided to the controller 108 via the user interface components 152 (e.g. manual entry), via the communication interface(s) 154 (through one or more messages from the utility provider or a user), via the peripheral(s) 156 (e.g. as a file transfer using a USB port, etc.), or via some other means. The rate schedule may be stored by the controller 108 in a persistent storage. Armed with this rate schedule, the controller 108 will be able to determine how much electricity from the power grid 112 is costing at any particular time.

In performing its control function, the controller 108 may use one or more cost threshold values. The one or more cost thresholds may be provided by a user, for example, via the user interface components 152 (e.g. manual entry), via the communication interface(s) 154 (through one or more messages from the user), via the peripheral(s) 156 (e.g. as a file transfer using a USB port, etc.), or via some other means. The one or more cost thresholds may also be calculated by the controller 108. For example, the controller 108 may calculate how much it costs for the generator 102 to generate a unit of electricity (in doing so, the controller 108 may take into account the cost of the gaseous fuel, the conversion efficiency of the generator 104, the amortized cost of maintaining the generator, etc.). However they are derived or obtained, the one or more cost thresholds are used by the controller 108 to determine when to have the EGS 102 generate electricity rather than using electricity from the power grid 112.

In one embodiment, the controller 108 may operate as follows. Specifically, the controller 108 may determine a current date and time (e.g. from the clock that is included in the peripheral(s) 156). Based on the current date and time, and the rate schedule, the controller 108 may determine the current cost of electricity from the power grid 112. The controller 108 may then compare this current cost with a cost threshold.

If the current cost exceeds the cost threshold, then the controller 108 may cause the generator 104 to generate and provide electricity to the electrical infrastructure 110 of the site. The controller 108 may do so by checking the state information maintained by the controller 108 to determine whether electricity from the generator 104 is already being provided to the electrical infrastructure 110. If so, then no further action needs to be taken. If not, then the controller 108 may determine whether the generator 104 is currently running (the generator 104 may be currently running, for example, because the one or more batteries are currently being charged). The controller 108 may again make this determination by checking the state information. If the generator 104 is currently running, then the controller 108 may cause the system of switches 118 to couple the output of the converter 116 to the input of the conditioner 120 and to couple the output of the conditioner 120 to the electrical infrastructure 110. This causes electricity from the generator 104 to be provided to the electrical infrastructure 110 of the site to supplement or replace electricity from the power grid 112. The controller 108 may thereafter update the state information to indicate that electricity from the generator 104 is currently being provided to the electrical infrastructure 110.

On the other hand, if the controller 108 determines that the generator 104 is not currently running, then the controller 108 may proceed to start the generator 104. The controller 108 may do so by causing the fuel regulator 240 to feed gaseous fuel to the combustion chamber 230 and by causing the air regulator 250 to blow intake air into the combustion chamber 230. The controller 108 may then cause the igniter 232 to ignite the gaseous fuel to give rise to combustion. The controller 108 may monitor the temperature sensor 260 until a certain operating temperature is reached, and then cause the starting mechanism 274 to initiate motion in the Stirling engine 114. The controller 108 may thereafter monitor the tachometer 262 and wait until a certain operational rate of revolution is reached (the controller 108 may cause the fuel regulator 240 to adjust the amount of gaseous fuel fed to the combustion chamber 230 until the desired rate of revolution is achieved). Once the operational rate of revolution is reached, the controller 108 may cause the system of switches 118 to couple the output of the converter 116 to the input of the conditioner 120 and to couple the output of the conditioner 120 to the electrical infrastructure 110. Electricity is thus provided by the generator 104 to the electrical infrastructure 110 of the site to supplement or replace electricity from the power grid 112. The controller 108 may thereafter update the state information to indicate that the generator 104 is currently running, and that electricity from the generator 104 is currently being provided to the electrical infrastructure 110.

In this embodiment, the controller 108 may cause the conditioner 120 to output electricity that is at a slightly higher voltage than the electricity from the power grid 112. This will cause electricity from the power grid 112 to not be used by the electrical infrastructure 110 of the site. Thus, the controller 108 causes electricity from the generator 104 to replace electricity from the power grid 112.

If the current cost does not exceed the cost threshold, then the controller 108 may cause the generator 104 to stop providing electricity to the electrical infrastructure 110. The controller 108 may do this by determining, based upon the state information, whether electricity from the generator 104 is currently being provided to the electrical infrastructure 110. If not, then no further action is needed. However, if electricity from the generator 104 is currently being provided to the electrical infrastructure 110, then the controller 108 may cause the system of switches 118 to decouple the output of the converter 116 from the input of the conditioner 120 and to decouple the output of the conditioner 120 from the electrical infrastructure 110. This causes electricity from the generator 104 to no longer be provided to the electrical infrastructure 110. The controller 108 may thereafter update the state information to indicate that electricity from the generator 104 is not currently being provided to the electrical infrastructure 110.

In addition, the controller 108 may determine whether to keep the generator 104 running. The controller 108 may keep the generator 104 running, for example, to charge the one or more batteries 132. If the controller 108 decides to keep the generator 104 running, then the controller 108 may cause the system of switches 118 to couple the output of the converter 116 to the charger 130 to enable the charger 130 to use the electricity from the generator 104 to charge the one or more batteries 132. If the controller 108 does so, it may update the state information to indicate that the one or more batteries 132 are currently being charged.

On the other hand, if the controller 108 decides to turn off the generator 104, then the controller 108 may cause the fuel regulator 240 to stop feeding gaseous fuel to the combustion chamber 230 and cause the air regulator 250 to stop blowing air into the combustion chamber 230. Without a heat source, the Stirling engine 114 will eventually stop operating. Thereafter, the controller 108 may update the state information to indicate that the generator 104 is not currently running.

In the manner described, the controller 108 may control the operation of the EGS 102 based on cost considerations.

Schedule Based Operation

In one embodiment, the controller 108 may control the operation of the EGS 102 based on a specified schedule. The schedule may be specified by a user, the utility provider, or some other entity. The schedule may be provided to the controller 108 via the user interface components 152 (e.g. manual entry), via the communication interface(s) 154 (through one or more messages from the user or the utility provider), via the peripheral(s) 156 (e.g. as a file transfer using a USB port, etc.), or via some other means. In accordance with the schedule, the controller 108 may, at specified times, cause the generator 104 to start or stop, cause electricity from the generator 104 to be provided or not to the electrical infrastructure 110, cause electricity from the one or more batteries 132 to be provided or not to the electrical infrastructure 110, cause the one or more batteries 132 to be charged or not, etc. The controller 108 may control these and other functions of the EGS 102 based on a specified schedule.

Manual Control Operation

In one embodiment, the controller 108 may control the operation of the EGS 102 in response to manual instructions from a user. These manual instructions may be received via the user interface components 152. The manual instructions may also be received via the communication interface(s) 154 as one or more messages. In response to these messages, the controller 108 may control the operation of the EGS 102 in accordance with instructions in the messages. For example, in response to the messages, the controller 108 may cause the generator 104 to start or stop, cause electricity from the generator 104 to be provided or not to the electrical infrastructure 110, cause electricity from the one or more batteries 132 to be provided or not to the electrical infrastructure 110, cause the one or more batteries 132 to be charged or not, etc. Since the communication interface(s) 154 may be used to send/receive messages to/from almost any device coupled to the Internet, a user can use almost any device (e.g. desktop computer, laptop computer, mobile device (e.g. tablet computer, mobile phone, smartphone, digital personal assistant, etc.), Internet-enabled or network-enabled appliance, etc.) coupled to the Internet to manually control the operation of the EGS 102.

Potential Variations

In the above discussion, for the sake of simplicity, the various modes of operation (e.g. utility provider controlled operation, load based operation, capacity based operation, cost based operation, schedule based operation, and manual controlled operation) are discussed separately. However, it should be noted that these modes of operation are not mutually exclusive. Rather, they may be implemented in combination, if so desired. For example, utility provider controlled operation, load based operation, capacity based operation, cost based operation, schedule based operation, and manual control operation may all be implemented concurrently, or just a subset of these modes of operation may be implemented concurrently. For purposes of the present invention, these modes of operation may be implemented individually or in any desired combination. All such combinations are within the scope of the present invention.

Enhancements/Modifications

In the description of the EGS 102 provided above, the EGS 102 comprises a single generator 104, a single interface 106, and a single controller 108. This represents a small scale EGS 102, which may be appropriate for smaller scale sites such as residences and small businesses. For larger scale sites, such as warehouses, plants, stores, etc., a larger scale EGS 102 may be implemented. Such an EGS 102 may have multiple generators 104, multiple interfaces 106, and perhaps even multiple controllers 108. For example, a larger scale EGS 102 may have a single controller 108 controlling a plurality of generators 104 and interfaces 106. An even larger scale EGS 102 may have a plurality of controllers 108, with each controller 108 controlling a plurality of generators 104 and interfaces 106. Thus, the EGS 102 may be scaled to fit the needs of the particular site. These and other enhancements are within the scope of the present invention.

In a larger scale EGS 102 having multiple generators 104 and interfaces 106 controlled by a single controller 108, the controller 108 may adapt to changing loads and capacities by bringing up and/or bringing down generators 104. For example, for loads up to a certain level, the controller 108 may start (if necessary) just one generator 104 and provide electricity from that generator (via an interface 106) to the electrical infrastructure 110. For loads between that level and a higher level, the controller 108 may start (if necessary) another generator 104 and provide electricity from that generator (via an interface 106) to the electrical infrastructure 110 as well. Electricity from more generators 104 may be provided to the electrical infrastructure 110 as the load increases. Conversely, as the load decreases, one or more generators 104 may be brought down to reduce the amount of electricity provided to the electrical infrastructure 110. A generator 104 may be brought up and brought down in the manner described previously. Thus, the controller 108 may adapt to changing loads by bringing up and/or bringing down generators 104.

The controller 108 may adapt to changing capacities in a similar manner. For example, for capacities down to a certain level, the controller 108 may start (if necessary) just one generator 104 and provide electricity from that generator (via an interface 106) to the electrical infrastructure 110. For capacities between that level and a lower level, the controller 108 may start (if necessary) another generator 104 and provide electricity from that generator (via an interface 106) to the electrical infrastructure 110 as well. Electricity from more generators 104 may be provided to the electrical infrastructure 110 as the capacity decreases. Conversely, as the electrical capacity provided by the power grid 112 increases, one or more generators 104 may be brought down to reduce the amount of electricity provided to the electrical infrastructure 110. Thus, the controller 108 may adapt to changing capacities by bringing up and/or bringing down generators 104.

In the embodiments described above, the EGS 102 provides electricity to the electrical infrastructure 110 of a site. If so desired, the EGS 102 may also provide electricity to the power grid 112 (the electricity may be provided to the power grid 112 through the interface 106, either directly or through the electrical infrastructure 110). Thus, the EGS 102 may act as a power source to boost or even replace the electricity provided by the power grid 112 to other sites. With such an arrangement, it is possible for a plurality of EGSs 102 to couple to a power grid 112 and to provide electricity to the power grid to completely eliminate the need for any external centralized electricity provider (such as a large scale utility provider). In effect, the plurality of EGSs 102 becomes the power grid 112. Such an arrangement (referred to herein as the EGS power grid) may be desirable, for example, in a situation where a gaseous fuel infrastructure is readily available but electricity from a centralized power grid is either not available or too expensive. An advantage of the EGS power grid is that it can be implemented locally, which means that it most likely will utilize short to mid-range power lines to distribute electricity to sites. Since short to mid-range power lines suffer lower losses than long range power lines, the EGS power grid is more efficient than a centralized power grid.

An EGS power grid may be implemented by having each of a plurality of sites (e.g. the residences and businesses of a town or city) implement an on-site EGS 102 that is coupled to a power grid 112. Each EGS 102 in the EGS power grid may provide electricity to the site on which it is implemented and to the power grid. The electricity provided by the various EGSs 102 to the power grid 112 may be distributed/shared based upon the needs of the sites. For example, during the day when businesses consume more electricity, the businesses may consume the electricity generated by the EGSs located at the business sites, plus surplus electricity from the power grid that is generated and provided by residence-based EGSs. Conversely, during evening hours when residences consume more electricity, the residences may consume the electricity generated by the EGSs located at the residence sites, plus surplus electricity from the power grid that is generated and provided by business-based EGSs. With such a sharing arrangement, the various EGSs can cooperate with each other to provide the electricity needed by all of the sites coupled to the power grid 112.

To enable an EGS 102 to participate in an EGS power grid, the controller 108 of an EGS 102 may monitor the load at the site and the capacity of the power grid 112, and determine the behavior of the EGS 102 accordingly. For example, when the load at the site is within a certain acceptable range and the capacity of the power grid 112 is within a certain acceptable range, then the controller 108 may cause the EGS 102 to operate autonomously to provide all of the electricity needed by the site. However, if the load at the site exceeds a certain level and the capacity of the power grid 112 is sufficiently high, then the controller 108 may cause additional electricity to be drawn from the power grid 112 to satisfy the load at the site. Furthermore, when the load at the site is within a certain range and the capacity of the power grid 112 is below a certain level, then the controller 108 may cause the EGS 102 to provide electricity to both the site and the power grid 112 to supplement the power grid 112. The controller 108 may operate in these and other manners. By dynamically adjusting the behavior of an EGS 102 based on changing conditions, the controller 108 of the EGS 102 enables the EGS 102 to participate in a power grid that dynamically adapts to operating conditions. In an EGS power grid, the interfaces 106 and controllers 108 of the EGSs may monitor the directional flow and production rates of electricity from the EGSs to enable costs and billings to be properly recognized and apportioned for all participating sites.

These and other modifications/enhancements are within the scope of the present invention.

At this point, it should be noted that although the invention has been described with reference to specific embodiments, the invention should not be construed to be so limited. Rather, various modifications may be made by those of ordinary skill in the art with the benefit of this disclosure without departing from the scope of the invention. Thus, the invention should not be limited by the specific embodiments used to illustrate it but only by the scope of the issued claims and the equivalents thereof.

What is claimed is:

1. A system, comprising:
a generator, wherein the generator comprises:
  a Stirling engine having a gaseous fuel intake for receiving gaseous fuel from a gaseous fuel infrastructure at a site, the Stirling engine operable to use the gaseous fuel for combustion to produce heat energy, and to convert the heat energy into mechanical motion; and
  a converter operable to convert the mechanical motion provided by the Stirling engine into electricity;
an interface coupled to receive electricity from the generator, the interface operable to selectively couple to an electrical infrastructure of the site to provide electricity thereto, wherein the electrical infrastructure is coupled to a power grid to receive electricity therefrom, and wherein the interface comprises a first conditioner and a set of one or more switches, wherein the first conditioner is operable to condition electricity received from the generator to produce electricity having characteristics that are compatible with electricity delivered from the power grid to the electrical infrastructure, and wherein the set of one or more switches is operable to selectively couple the first conditioner to the electrical infrastructure to cause electricity from the generator, conditioned by the first conditioner, to be provided to the electrical infrastructure; and
a controller operable to automatically control operation of the generator and the interface, the controller configured to automatically control operation of the Stirling engine, including selectively causing the Stirling engine to start or stop, and to automatically control operation of the one or more switches, including selectively causing the one or more switches to couple the first conditioner to or decouple the first conditioner from the electrical infrastructure, based upon one or more considerations;
wherein a set of rate schedule information specifies how much electricity provided by the power grid costs at various times, and wherein the controller is configured to automatically cause the Stirling engine to start or stop, thereby causing the generator to start or stop generating electricity, and to automatically cause the one or more switches to couple the first conditioner to or decouple the first conditioner from the electrical infrastructure, based at least in part upon the rate schedule information.

2. The system of claim 1, wherein the first conditioner is operable to condition electricity received from the generator to produce electricity having a voltage, a frequency, and a phase structure compatible with electricity delivered from the power grid to the electrical infrastructure.

3. The system of claim 1, wherein the controller comprises a communication interface operable to receive a first message from a component external to the system, wherein the first message indicates that the system should provide electricity to the electrical infrastructure, and wherein the controller is configured to respond to the first message by automatically causing the one or more switches to couple the first conditioner to the electrical infrastructure to cause electricity from the generator, conditioned by the first conditioner, to be provided to the electrical infrastructure.

4. The system of claim 1, wherein the controller comprises a communication interface operable to receive a first message from a component external to the system, wherein the message indicates that the system should provide electricity to the electrical infrastructure, and wherein the controller is configured to respond to the first message by automatically causing the Stirling engine to be started to cause the generator to start generating electricity and by automatically causing the one or more switches to couple the first conditioner to the electrical infrastructure to cause electricity from the generator, conditioned by the first conditioner, to be provided to the electrical infrastructure.

5. The system of claim 3, wherein the communication interface is operable to receive a second message indicating that the system should cease providing electricity to the electrical infrastructure, and wherein the controller is configured to respond to the second message by automatically causing the one or more switches to decouple the first conditioner from the electrical infrastructure.

6. The system of claim 3, wherein the communication interface is operable to receive a second message indicating that the system should cease providing electricity to the electrical infrastructure, and wherein the controller is configured to respond to the second message by automatically causing the one or more switches to decouple the first conditioner from the electrical infrastructure and automatically causing the Stirling engine to stop operation.

7. The system of claim 3, wherein the communication interface is a network interface communicatively coupled to a network, and wherein the first message is received as one or more network packets.

8. The system of claim 3, wherein the communication interface is coupled to the power grid, and wherein the first message is received via the power grid.

9. The system of claim 3, wherein the first message is sent by a utility provider that manages the power grid.

10. The system of claim 3, wherein the first message is sent by a user.

11. The system of claim 1, wherein the interface further comprises one or more load sensors operable to sense an electrical load imposed on the electrical infrastructure of the site, and wherein the controller is configured to determine whether the electrical load surpasses a threshold, and in response to a determination that the electrical load surpasses the threshold, to automatically cause the one or more switches to couple the first conditioner to the electrical infrastructure to cause electricity from the generator, conditioned by the first conditioner, to be provided to the electrical infrastructure.

12. The system of claim 11, wherein the controller is further configured to automatically control operation of the Stirling engine, based at least in part upon the electrical load, to cause the generator to generate more or less electricity to adapt to the electrical load.

13. The system of claim 12, wherein the system further comprises a fuel regulator operable to control how much gaseous fuel is fed from the gaseous fuel infrastructure to the gaseous fuel intake of the Stirling engine, and wherein the controller is configured to control operation of the Stirling engine by:
  determining, based at least in part upon the electrical load, whether more or less electricity should be generated by the generator;
  in response to a determination that less electricity should be generated, causing the fuel regulator to feed less gaseous fuel to the gaseous fuel intake of the Stirling engine; and
  in response to a determination that more electricity should be generated, causing the fuel regulator to feed more gaseous fuel to the gaseous fuel intake of the Stirling engine.

14. The system of claim 1, wherein the interface further comprises one or more load sensors operable to sense an electrical load imposed on the electrical infrastructure of the site, and wherein the controller is configured to determine whether the electrical load surpasses a threshold, and in response to a determination that the electrical load surpasses the threshold, to automatically cause the Stirling engine to be started to cause the generator to start generating electricity and to automatically cause the one or more switches to couple the first conditioner to the electrical infrastructure to cause electricity from the generator, conditioned by the first conditioner, to be provided to the electrical infrastructure.

15. The system of claim 1, wherein the system further comprises one or more batteries, wherein the interface further comprises one or more load sensors operable to sense an electrical load imposed on the electrical infrastructure of the site, and wherein the controller is configured to:
  determine whether the electrical load surpasses a threshold;
  in response to a determination that the electrical load surpasses the threshold:
    automatically cause the one or more switches to couple both the generator and the one or more batteries to the first conditioner and to couple the first conditioner to the electrical infrastructure to cause electricity from both the generator and the one or more batteries, conditioned by the first conditioner, to be provided to the electrical infrastructure.

16. The system of claim 1, wherein the system further comprises one or more batteries and a second conditioner, the second conditioner operable to condition electricity received from the one or more batteries to produce electricity that has characteristics that are compatible with electricity from the power grid, wherein the interface further comprises one or more load sensors operable to sense an electrical load imposed on the electrical infrastructure of the site, and wherein the controller is configured to:
  determine whether the electrical load surpasses a threshold;
  in response to a determination that the electrical load surpasses the threshold:
    automatically cause the one or more switches to couple the first conditioner to the electrical infrastructure to cause electricity from the generator, conditioned by the first conditioner, to be provided to the electrical infrastructure; and
    automatically cause the one or more switches to couple the second conditioner to the electrical infrastructure to cause electricity from the one or more batteries, conditioned by the second conditioner, to also be provided to the electrical infrastructure.

17. The system of claim 1, wherein the system further comprises one or more batteries, wherein the interface further comprises one or more load sensors operable to sense an electrical load imposed on the electrical infrastructure of the site, and wherein the controller is configured to:
  determine whether the electrical load surpasses a first threshold;
  in response to a determination that the electrical load surpasses the first threshold:
    automatically cause the one or more switches to couple the generator to the first conditioner and to couple the first conditioner to the electrical infrastructure to cause electricity from the generator, conditioned by the first conditioner, to be provided to the electrical infrastructure;
  determine whether the electrical load surpasses a second, higher threshold;
  in response to a determination that the electrical load surpasses the second threshold:
    automatically cause the one or more switches to also couple the one or more batteries to the first conditioner to cause electricity from both the generator and the one or more batteries, conditioned by the first conditioner, to be provided to the electrical infrastructure.

18. The system of claim 1, wherein the system further comprises one or more batteries and a second conditioner, the second conditioner operable to condition electricity received from the one or more batteries to produce electricity that has characteristics that are compatible with electricity from the power grid, wherein the interface further comprises one or more load sensors operable to sense an electrical load imposed on the electrical infrastructure of the site, and wherein the controller is configured to:
  determine whether the electrical load surpasses a first threshold;
  in response to a determination that the electrical load surpasses the first threshold:
    automatically cause the one or more switches to couple the first conditioner to the electrical infrastructure to cause electricity from the generator, conditioned by the first conditioner, to be provided to the electrical infrastructure;
  determine whether the electrical load surpasses a second, higher threshold;
  in response to a determination that the electrical load surpasses the second threshold:
    automatically cause the one or more switches to couple the second conditioner to the electrical infrastructure to cause electricity from the one or more batteries, conditioned by the second conditioner, to also be provided to the electrical infrastructure, such that electricity from both the generator and the one or more batteries is provided to the electrical infrastructure.

19. The system of claim 1, wherein the interface further comprises one or more capacity sensors operable to sense an electrical capacity provided by the power grid to the electrical infrastructure of the site, and wherein the controller is configured to determine whether the electrical capacity is below a threshold, and in response to a determination that the electrical capacity is below the threshold, to automatically cause the one or more switches to couple the first conditioner to the electrical infrastructure to cause electricity from the generator, conditioned by the first conditioner, to be provided to the electrical infrastructure.

20. The system of claim 19, wherein the threshold is set at a level that is substantially higher than an outage level, wherein the outage level is a capacity level that would be exhibited when the power grid is experiencing an outage.

21. The system of claim 19, wherein the controller is further configured to automatically control operation of the Stirling engine, based at least in part upon the electrical capacity provided by the power grid, to cause the generator to generate more or less electricity to adapt to the electrical capacity provided by the power grid.

22. The system of claim 21, wherein the system further comprises a fuel regulator operable to control how much gaseous fuel is fed from the gaseous fuel infrastructure to the gaseous fuel intake of the Stirling engine, and wherein the controller is configured to control operation of the Stirling engine by:
determining, based at least in part upon the electrical capacity, whether more or less electricity should be generated by the generator;
in response to a determination that less electricity should be generated, causing the fuel regulator to feed less gaseous fuel to the gaseous fuel intake of the Stirling engine; and
in response to a determination that more electricity should be generated, causing the fuel regulator to feed more gaseous fuel to the gaseous fuel intake of the Stirling engine.

23. The system of claim 1, wherein the interface further comprises one or more capacity sensors operable to sense an electrical capacity provided by the power grid to the electrical infrastructure of the site, and wherein the controller is configured to determine whether the electrical capacity falls below a threshold, and in response to a determination that the electrical capacity falls below the threshold, to automatically cause the Stirling engine to be started to cause the generator to start generating electricity and to automatically cause the one or more switches to couple the first conditioner to the electrical infrastructure to cause electricity from the generator, conditioned by the first conditioner, to be provided to the electrical infrastructure.

24. The system of claim 1, wherein the system further comprises one or more batteries, wherein the interface further comprises one or more capacity sensors operable to sense an electrical capacity provided by the power grid to the electrical infrastructure of the site, and wherein the controller is configured to:
determine whether the electrical capacity falls below a threshold;
in response to a determination that the electrical capacity falls below the threshold:
automatically cause the one or more switches to couple both the generator and the one or more batteries to the first conditioner and to couple the first conditioner to the electrical infrastructure to cause electricity from both the generator and the one or more batteries, conditioned by the first conditioner, to be provided to the electrical infrastructure.

25. The system of claim 1, wherein the system further comprises one or more batteries and a second conditioner, the second conditioner operable to condition electricity received from the one or more batteries to produce electricity that has characteristics that are compatible with electricity from the power grid, wherein the interface further comprises one or more capacity sensors operable to sense an electrical capacity provided by the power grid to the electrical infrastructure of the site, and wherein the controller is configured to:
determine whether the electrical capacity falls below a threshold;
in response to a determination that the electrical capacity falls below the threshold:
automatically cause the one or more switches to couple the first conditioner to the electrical infrastructure to cause electricity from the generator, conditioned by the first conditioner, to be provided to the electrical infrastructure; and
automatically cause the one or more switches to couple the second conditioner to the electrical infrastructure to cause electricity from the one or more batteries, conditioned by the second conditioner, to also be provided to the electrical infrastructure.

26. The system of claim 1, wherein the system further comprises one or more batteries, wherein the interface further comprises one or more capacity sensors operable to sense an electrical capacity provided by the power grid to the electrical infrastructure of the site, and wherein the controller is configured to:
determine whether the electrical capacity falls below a first threshold;
in response to a determination that the electrical capacity falls below the first threshold:
automatically cause the one or more switches to couple the generator to the first conditioner and to couple the first conditioner to the electrical infrastructure to cause electricity from the generator, conditioned by the first conditioner, to be provided to the electrical infrastructure;
determine whether the electrical capacity falls below a second, lower threshold;
in response to a determination that the electrical capacity falls below the second threshold:
automatically cause the one or more switches to also couple the one or more batteries to the first conditioner to cause electricity from both the generator and the one or more batteries, conditioned by the first conditioner, to be provided to the electrical infrastructure.

27. The system of claim 1, wherein the system further comprises one or more batteries and a second conditioner, the second conditioner operable to condition electricity received from the one or more batteries to produce electricity that has characteristics that are compatible with electricity from the power grid, wherein the interface further comprises one or more capacity sensors operable to sense an electrical capacity provided by the power grid to the electrical infrastructure of the site, and wherein the controller is configured to:
determine whether the electrical capacity falls below a first threshold;
in response to a determination that the electrical capacity falls below the first threshold:
automatically cause the one or more switches to couple the first conditioner to the electrical infrastructure to cause electricity from the generator, conditioned by the first conditioner, to be provided to the electrical infrastructure;
determine whether the electrical capacity falls below a second, lower threshold;
in response to a determination that the electrical capacity falls below the second threshold:
automatically cause the one or more switches to couple the second conditioner to the electrical infrastructure to cause electricity from the one or more batteries, conditioned by the second conditioner, to also be provided to the electrical infrastructure, such that electricity from both the generator and the one or more batteries is provided to the electrical infrastructure.

28. The system of claim 1, wherein the controller is configured to automatically cause the Stirling engine to start, and to automatically cause the one or more switches to couple the first conditioner to the electrical infrastructure, when the cost of electricity provided by the power grid is above a threshold.

29. The system of claim 28, wherein the controller is configured to calculate the threshold.

30. The system of claim 1, wherein the controller is configured to automatically cause the Stirling engine to start or stop, thereby causing the generator to start or stop generating electricity, and to automatically cause the one or more switches to couple the first conditioner to or to decouple the first conditioner from the electrical infrastructure, in accordance with a set schedule.

31. The system of claim 1, wherein the system further comprises:
a starting mechanism operable to initiate mechanical motion in the Stirling engine;
a fuel regulator operable to control the amount of gaseous fuel provided from the gaseous fuel infrastructure to the gaseous fuel intake of the Stirling engine; and
an igniter;
wherein the controller is configured to start the Stirling engine by automatically causing the fuel regulator to provide gaseous fuel to the gaseous fuel intake of the Stirling engine, automatically causing the igniter to ignite the gaseous fuel to initiate combustion, and automatically causing the starting mechanism to initiate mechanical motion in the Stirling engine.

32. The system of claim 1, wherein the converter is operable in a first mode in which mechanical motion is converted into electricity and a second mode in which electricity is converted into mechanical motion, and wherein the system further comprises:
a fuel regulator operable to control the amount of gaseous fuel provided from the gaseous fuel infrastructure to the gaseous fuel intake of the Stirling engine; and
an igniter;
wherein the controller is configured to start the Stirling engine by automatically causing the fuel regulator to provide gaseous fuel to the gaseous fuel intake of the Stirling engine, automatically causing the igniter to ignite the gaseous fuel to initiate combustion, and automatically causing the converter to operate in the second mode to initiate mechanical motion in the Stirling engine.

33. The system of claim 1, further comprising a heat exchanger that uses heated air exhausted from the Stirling engine to preheat incoming air that is provided to the Stirling engine to support combustion.

34. The system of claim 1, further comprising a heat exchanger that uses heated air exhausted from the Stirling engine to preheat incoming gaseous fuel that is provided to the gaseous fuel intake of the Stirling engine.

35. The system of claim 1:
wherein the system further comprises one or more batteries and a charger coupled to the one or more batteries;
wherein the one or more switches of the interface are operable to selectively couple the generator to the charger to deliver electricity generated by the generator to the charger for charging the one or more batteries;
wherein the one or more switches of the interface are operable to selectively couple the one or more batteries to a second conditioner that conditions electricity received from the one or more batteries to produce electricity that has characteristics that are compatible with electricity from the power grid;
wherein the one or more switches of the interface are operable to selectively couple the second conditioner to the electrical infrastructure to selectively provide electricity thereto;
wherein the first conditioner and the second conditioner may be the same conditioner or separate conditioners; and
wherein the controller is configured to automatically control the one or more switches to selectively cause the one or more batteries to be charged and to selectively cause electricity from the one or more batteries to be delivered to the electrical infrastructure, based upon one or more considerations.

36. The system of claim 1, wherein the gaseous fuel infrastructure at the site is an underground gas distribution network, and wherein the gaseous fuel intake of the Stirling engine is coupled to the underground gas distribution network to receive gaseous fuel therefrom.

37. A system, comprising:
a generator, wherein the generator comprises:
a Stirling engine having a gaseous fuel intake for receiving gaseous fuel from a gaseous fuel infrastructure at a site, the Stirling engine operable to use the gaseous fuel for combustion to produce heat energy, and to convert the heat energy into mechanical motion; and
a converter operable to convert the mechanical motion provided by the Stirling engine into electricity;
an interface coupled to the generator and an electrical infrastructure of the site, the interface facilitating provision of electricity from the generator to the electrical infrastructure, the interface comprising one or more load sensors operable to sense an electrical load imposed on the electrical infrastructure of the site; and
a controller operable to automatically control operation of the generator, the controller configured to control operation of the Stirling engine, based at least in part upon the electrical load imposed on the electrical infrastructure, to cause the generator to generate more or less electricity to adapt to the electrical load;
wherein a set of rate schedule information specifies how much electricity provided by the power grid costs at various times, and wherein the controller is configured to automatically cause the Stirling engine to start or stop, thereby causing the generator to start or stop generating electricity, and to automatically cause the one or more switches to couple the first conditioner to or decouple the first conditioner from the electrical infrastructure, based at least in part upon the rate schedule information.

38. The system of claim 37, wherein the controller is configured to control operation of the Stirling engine by:
determining, based at least in part upon the electrical load, whether more or less electricity should be generated by the generator;
in response to a determination that less electricity should be generated, causing the Stirling engine to produce less mechanical motion, thereby causing the generator to generate less electricity; and
in response to a determination that more electricity should be generated, causing the Stirling engine to produce more mechanical motion, thereby causing the generator to generate more electricity.

39. The system of claim 37, wherein the system further comprises a fuel regulator operable to control how much gaseous fuel is fed from the gaseous fuel infrastructure to the gaseous fuel intake of the Stirling engine, and wherein the controller is configured to control operation of the Stirling engine by:

determining, based at least in part upon the electrical load, whether more or less electricity should be generated by the generator;

in response to a determination that less electricity should be generated, causing the fuel regulator to feed less gaseous fuel to the gaseous fuel intake of the Stirling engine; and in response to a determination that more electricity should be generated, causing the fuel regulator to feed more gaseous fuel to the gaseous fuel intake of the Stirling engine.

40. A system, comprising:

a plurality of generators, wherein each generator comprises:

a Stirling engine having a gaseous fuel intake for receiving gaseous fuel from a gaseous fuel infrastructure at a site, the Stirling engine operable to use the gaseous fuel for combustion to produce heat energy, and to convert the heat energy into mechanical motion; and a converter operable to convert the mechanical motion provided by the Stirling engine into electricity;

a plurality of interfaces, each interface operable to selectively couple a corresponding generator to an electrical infrastructure of the site to provide electricity thereto;

one or more load sensors operable to sense an electrical load imposed on the electrical infrastructure of the site; and a controller operable to automatically control operation of the plurality of generators and interfaces based, at least in part, upon the electrical load imposed on the electrical infrastructure to cause more or less electricity to be provided to the electrical infrastructure to adapt to the electrical load, wherein the controller is configured to control the operation of the plurality of generators and interfaces by:

determining, based at least in part upon the electrical load, whether more or less electricity should be provided to the electrical infrastructure;

in response to a determination that less electricity should be provided to the electrical infrastructure, causing at least one of the interfaces to decouple a corresponding generator from the electrical infrastructure to cause electricity from the corresponding generator to no longer be provided to the electrical infrastructure; and in response to a determination that more electricity should be provided to the electrical infrastructure, causing at least one of the interfaces to couple a corresponding generator to the electrical infrastructure to cause electricity from the corresponding generator to be provided to the electrical infrastructure;

wherein a set of rate schedule information specifies how much electricity provided by the power grid costs at various times, and wherein the controller is configured to automatically cause the Stirling engine to start or stop, thereby causing the generator to start or stop generating electricity, and to automatically cause the one or more switches to couple the first conditioner to or decouple the first conditioner from the electrical infrastructure, based at least in part upon the rate schedule information.

41. The system of claim 40, wherein the controller is further configured to control the operation of the plurality of generators and interfaces by:

in response to a determination that less electricity should be provided to the electrical infrastructure, causing the Stirling engine of the corresponding generator to stop operation.

42. The system of claim 40, wherein the controller is further configured to control the operation of the plurality of generators and interfaces by:

in response to a determination that more electricity should be provided to the electrical infrastructure, causing the Stirling engine of the corresponding generator to start operation.

43. A system, comprising:

a plurality of electricity generation systems (EGSs), each EGS implemented at a corresponding site, and each EGS comprising:

a generator, comprising:

a Stirling engine having a gaseous fuel intake for receiving gaseous fuel from a gaseous fuel infrastructure at a corresponding site, the Stirling engine operable to use the gaseous fuel for combustion to produce heat energy, and to convert the heat energy into mechanical motion; and a converter operable to convert the mechanical motion provided by the Stirling engine into electricity;

an interface operable to selectively couple the generator to an electrical infrastructure of the corresponding site to provide electricity thereto, and to selectively couple the generator to a power grid to provide electricity thereto; and a controller operable to automatically control operation of the EGS based, at least in part, upon one or more conditions, to selectively cause the interface to couple the generator to the electrical infrastructure of the corresponding site to provide electricity thereto, and to selectively cause the interface to couple the generator to the power grid to provide electricity thereto;

wherein a set of rate schedule information specifies how much electricity provided by the power grid costs at various times, and wherein the controller is configured to automatically cause the Stirling engine to start or stop, thereby causing the generator to start or stop generating electricity, and to automatically cause the one or more switches to couple the first conditioner to or decouple the first conditioner from the electrical infrastructure, based at least in part upon the rate schedule information;

wherein the generator of each EGS is selectively coupled to the power grid to provide electricity thereto; and wherein the power grid is local to the plurality of EGSs such that the power grid transports electricity provided by the plurality of EGSs but not electricity provided by any external electricity provider.

44. The system of claim 43, wherein the plurality of EGSs comprises a particular EGS having a particular generator, a particular interface, and a particular controller, wherein the particular EGS is implemented at a particular site having a particular electrical infrastructure, and wherein the particular controller determines, based at least in part upon a load on the particular electrical infrastructure and a capacity of the power grid, whether to cause the particular interface to couple the particular generator to the power grid to provide electricity thereto.

\* \* \* \* \*